United States Patent

Tsuchiya et al.

[11] Patent Number: 5,857,034
[45] Date of Patent: Jan. 5, 1999

[54] SYSTEM FOR INPUTTING CHARACTER DATA

[75] Inventors: Masayuki Tsuchiya, Hiratsuka; Toshihiko Matsuda; Hitoshi Suzuki, both of Owariasahi; Hiroshi Fujise, Yokohama, all of Japan

[73] Assignees: Hitachi, Ltd., Tokyo; Hitachi Software Engineering Company, Ltd., Kanagawa-ken, both of Japan

[21] Appl. No.: 885,775

[22] Filed: May 20, 1992

[30] Foreign Application Priority Data

May 21, 1991 [JP] Japan ..................................... 3-115857

[51] Int. Cl.⁶ ...................................................... G06K 9/78
[52] U.S. Cl. ............................................ 382/175; 382/283
[58] Field of Search ...................................... 395/148, 149, 395/768, 769; 382/61, 62, 63, 57, 40, 7, 175, 283, 311, 309, 138; 358/450, 462

[56] References Cited

U.S. PATENT DOCUMENTS

| | | | |
|---|---|---|---|
| 4,807,123 | 2/1989 | Komatsu et al. ........................ | 707/508 |
| 4,933,979 | 6/1990 | Suzuki et al. ........................... | 382/173 |
| 4,933,984 | 6/1990 | Nakano et al. ......................... | 382/175 |
| 5,040,226 | 8/1991 | Elischer et al. ........................ | 382/175 |
| 5,119,437 | 6/1992 | Kuwamura et al. ..................... | 382/175 |
| 5,123,062 | 6/1992 | Sangu ..................................... | 382/174 |
| 5,140,650 | 8/1992 | Casey et al. ............................ | 382/283 |
| 5,182,656 | 1/1993 | Chevion et al. ........................ | 382/283 |
| 5,258,855 | 11/1993 | Lech et al. .............................. | 382/291 |
| 5,293,429 | 3/1994 | Pizano et al. ........................... | 382/202 |

OTHER PUBLICATIONS

"Software aims at decreasing manual data entry" *PC Week* Nov. 5, 1990 v.7 n.44 p. 36.
"Intelliform" from the Microcomputer Software Guide on DIALOG Information Service, Jan. 1991.

*Primary Examiner*—Jon Chang
*Attorney, Agent, or Firm*—Antonelli, Terry, Stout & Kraus, LLP

[57] ABSTRACT

A character data input method for an information processing system. Image information on a form which has only a format and on which no data is recorded is read from an input unit for inputting image information. A plurality of input areas in which data is recorded is prescribed by utilizing this image information. Image information on the same form on which data is recorded is thereafter read from the input unit. The format and data are discriminated from image information on the form on which data is recorded based on the recognized character pattern and border pattern of the format and the information prescribing the data input areas to recognize a character pattern in each data input area.

7 Claims, 22 Drawing Sheets

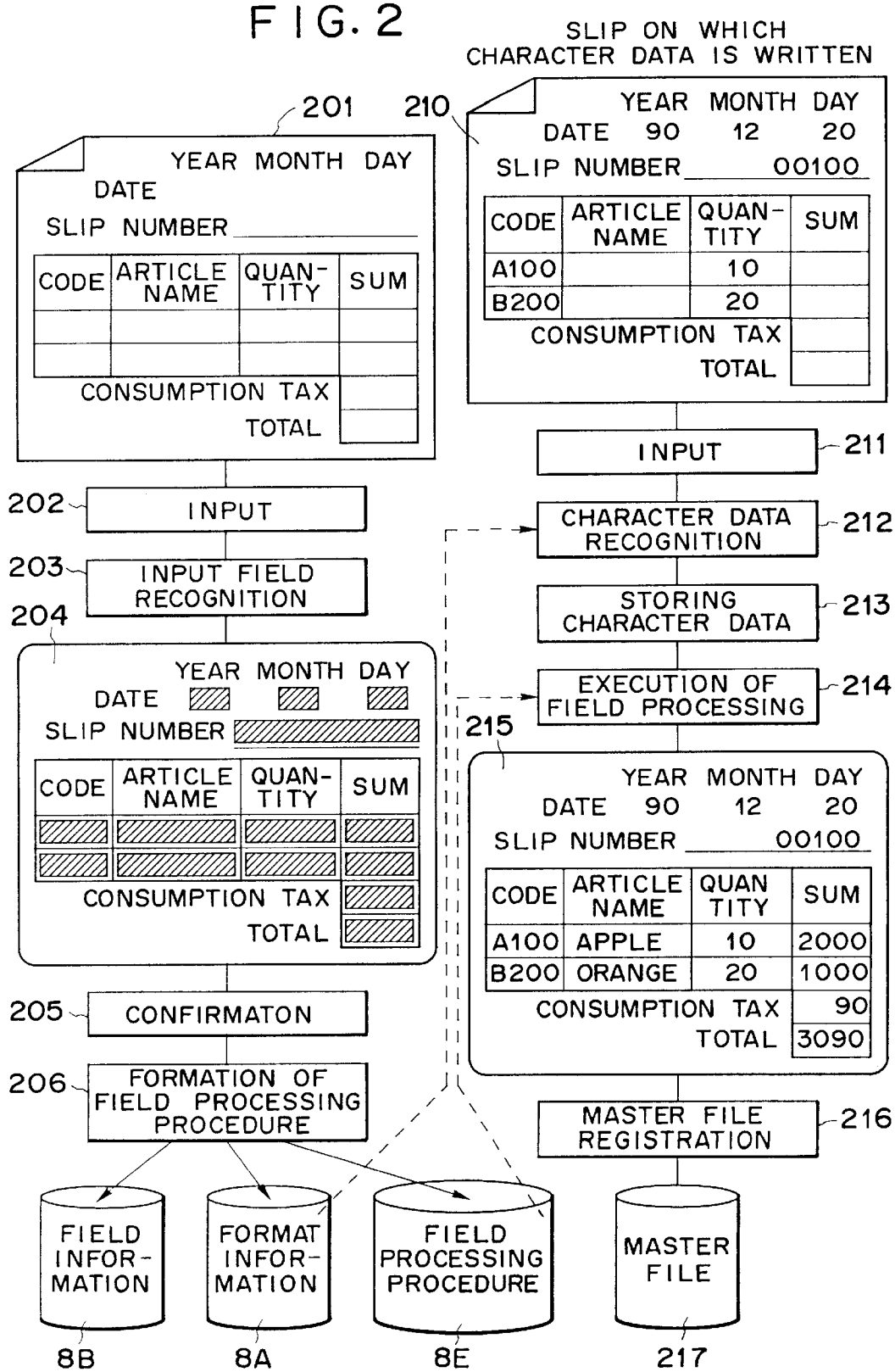

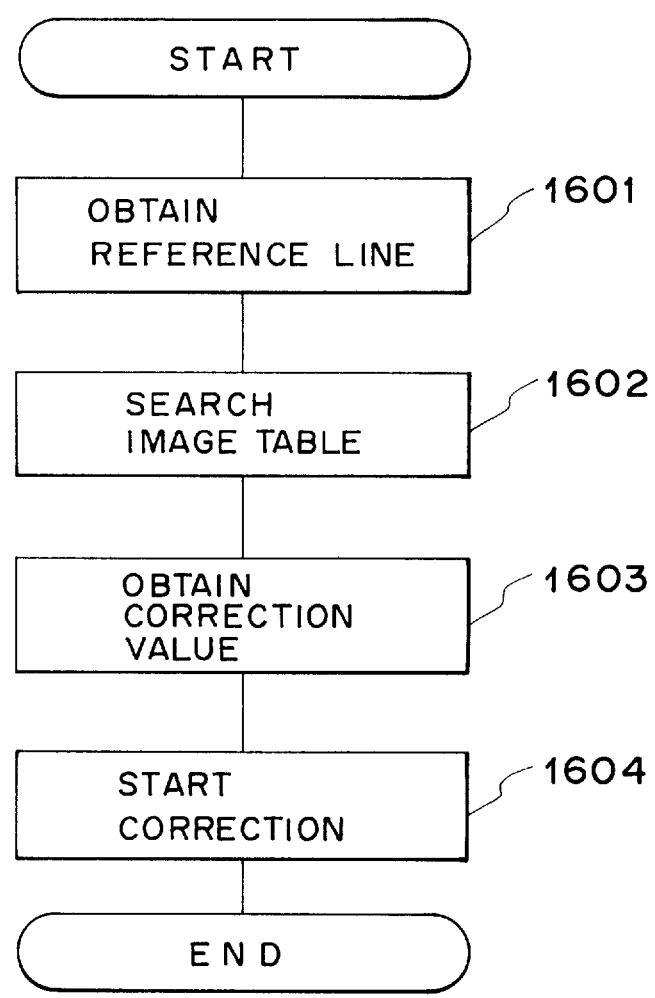
F I G. 16

| 1909 | | | | |
|---|---|---|---|---|
| CENTER LINE | RADIUS | THICKNESS | START ANGLE | END ANGLE |
| (110, 170) | 8 | 2 | 180 | 90 |
| (200, 170) | 8 | 2 | 180 | 90 |

SYSTEM FOR INPUTTING CHARACTER DATA

BACKGROUND OF THE INVENTION

This invention relates to a technical field in which character data written on a chit or register slip is processed with a computer, and, more particularly, to a system for inputting character data without using any special form for an optical character reader (hereinafter referred to as an OCR).

Conventionally, OCRs are used to input character data on chits or register slips. For OCRs, a special register slip is utilized such that format information (borders, ruled lines and entry space names in this case, although borders, ruled lines, entry space names and the relationship between entry spaces are usually included) is dropped out at the time of inputting so as to read character data alone. A system has also been developed in which characters on a register slip can be read without using such a special register slip. For example, in the system disclosed in Japanese Patent Laid-Open S60-160486, pattern data corresponding to one line of characters and mating character borders recorded on a register slip is stored in a memory, and a character border pattern is detected from the memory based on the character border data to cut out a character pattern with respect to each character, thereby effecting character recognition. This conventional system entails problems described below.

In this system, although the need for a special register slip has been eliminated, character data not surrounded by borders, character data which is underlined and character data recorded inside borders rounded at space corners, which are commonly seen in ordinary register slips, cannot be recognized correctly. Further, if one input area includes a plurality of lines as in the case of ordinary register slips, recognition must be effected with respect to each line.

Also, there is a need to solve the problem of a register slip being shifted or inclined when it is input, and the problem of border lines on a register slip being shifted when the register slip is being copied.

Conventionally, values of sum spaces or the like on a register slip are directly read from the slip, but it is necessary for the user to confirm, by calculation, whether they are correctly read. There is also a need to check the conformity between a set of particular data items, such as client's names and client codes or commodity names and commodity codes, related to each other by codes.

SUMMARY OF THE INVENTION

An object of the present invention is to enable character data not surrounded by borders, character data which is underlined and character data recorded inside borders rounded at space corners on register slips or chits conventionally used to be input to a computer, as well as data on a special OCR form.

Another object of the present invention is to enable use of a copy of a register slip by correcting a positional error of the format of the register slip, and to correct any positional error or inclination of the data when the register slip is input.

Still another object of the present invention is to enable data recorded on a chit or register slip to be checked.

To achieve these objects, in one aspect of the present invention, there is provided a method comprising reading image information on a form which has only a format and on which no data is recorded from the input unit for inputting image information, forming field information determining input areas by recognizing a character pattern and a border pattern of the format included in the read image information, storing the character pattern, the border pattern and the input field information as first information, reading from the input unit image information on a face of the same form on which data is recorded, and discriminating the format and data from this image information based on the first information to recognize a character pattern of each data section and to form second information consisting of data corresponding to each input area.

In another aspect of the present invention, there is provided a method comprising reading image information on a form which has only a format and on which no data is recorded from the input unit for inputting image information, forming field information determining input areas by recognizing a character pattern and a border pattern of the format included in the read image information, storing the character pattern, the border pattern and the input field information as first information, reading from the input unit image information on a face of the same form on which data is recorded, and correcting a positional error and/or an inclination of the image information of the face of the form on which data is recorded based on the first information to correct a deviation of the image information on the face of the form on which data is recorded relative to the image information on the face of the form which has the format, but on which data is not recorded.

In still another aspect of the invention, there is provided a method further comprising forming at least one processing procedure with respect to a format and data recorded on a form according to words in the format by referring to the first information, storing as third information the information obtained by processing the second information in this manner, and displaying both the second and third information.

Information on the face of the form which has only a format and on which no character data is recorded is read as image information, and the format of the form is formed as format information. Character data input area information is formed from this format information. The format information and the character data input area information constitute the first information. The character data recorded on the form is recognized based on the first information, character data recorded on an ordinary chit, slip or the like without being surrounded by borders, so that character data not surrounded by borders, character data which is underlined and character data surrounded by borders rounded at corners can be input, that is, data on an ordinary chit or register slip can be input to a computer by an OCR input unit.

Also, a positional error and/or an inclination of the form on which character data is recorded, which error occurs when the form is input to the input unit, and a positional error of the form can be corrected, so that the user need not have difficulty in preventing a positional error or inclination of the form at the time of inputting the form as an image.

Further, a processing procedure is formed with respect to the second information and the corresponding processing is executed, so that a subtotal and a total of values written in input areas, results of calculation of a tax, and kanji/kana data corresponding to input data can be displayed, thereby making it possible to instantly check the appropriateness of the input character data.

BRIEF DESCRIPTION OF THE DRAWINGS

FIG. 2 is a diagram of a flow of a character data process in accordance with the embodiment of the present invention;

FIG. 16 is a flowchart of an example of a format correction process in accordance with the embodiment of the present invention;

FIGS. 21A, and 21B-1 and 21B-2 are flowcharts in accordance with the embodiment of the present invention, with FIG. 21B indicating the relationship of FIGS. 21B-1 and 21B-2.

DETAILED DESCRIPTION OF THE PREFERRED EMBODIMENT

Preferred embodiments of the present invention will be described below with reference to the accompanying drawings.

Figure 1:
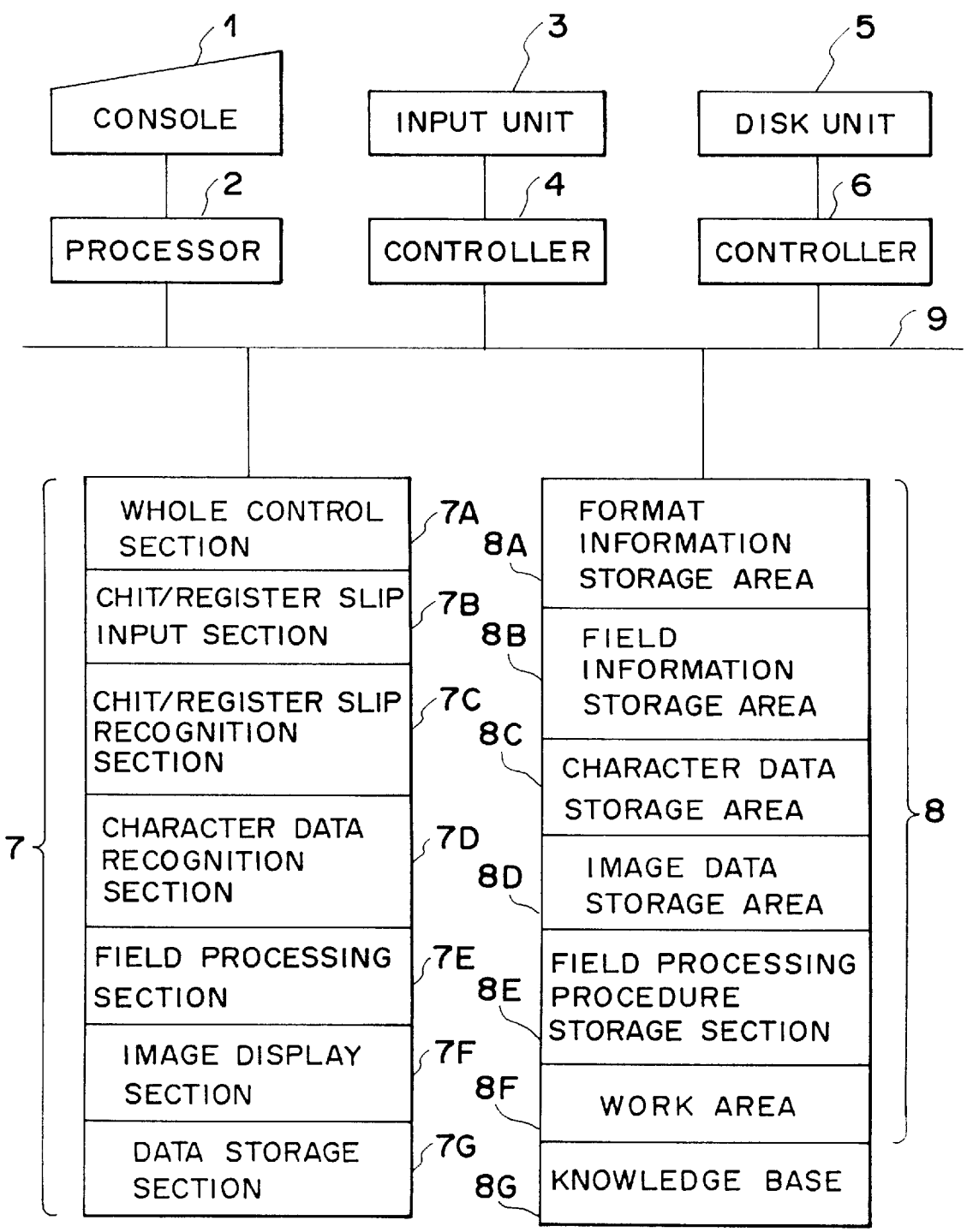
FIG. 1 is a block diagram of an embodiment of the present invention.

FIG. 1 is a diagram of the overall construction of an information processing system to which the present invention is applied. The information processing system shown in FIG. 1 is constituted of a console 1, a processor 2 connected to the console 1, a controller 4 connected to the processor 2 through a transmission path 9, an input unit 3 connected to and controlled by the controller 4, a controller 6 connected to the transmission path 9, a disk unit 5 connected to and controlled by the controller 6, a processing unit 7 connected to the transmission path 9 and serving to perform processing for the processor 2, and a data unit 8 connected to the transmission path 9 and used to store data.

The processing unit 7 has an overall control section 7A, a chit/register slip input section 7B, a chit/register slip recognition section 7C, a character data recognition section 7D, a field processing section 7E, an image display section 7F, and a data storage section 7G. The data unit 8 has a format information storage area 8A, a field information storage area 8B, a character data storage area 8C, an image data storage area 8D, a field processing procedure storage section 8E, a work area 8F, and a knowledge base 8G.

When the overall control section 7A is called by the processor 2, it stores an image input from the input unit 3 to the chit/register slip input section 7B in the image data storage area SD.

If a chit or a register slip on which no character data is recorded is input, the overall control section 7A makes the chit-register slip recognition section 7C recognize ruled lines and characters in accordance with the format of image data stored in the image data storage area 8D based on a knowledge base provided in the disk unit 5 and store the recognized format information in the format information storage area 8A. The chit-register slip recognition section 7C determines character data input areas, prepares field processing procedures, and stores the input areas and the field processing procedures in the field information storage area 8B and the field processing procedure storage section 8E, respectively.

The disk unit 5 has files corresponding respectively to the format information storage area 8A, the field information storage area 8B, the character data storage area 8C, the image data storage area 8D, the field processing procedure storage section 8E and the knowledge base 8G. After processing in the data unit 8, categories of data therein are respectively stored in the corresponding files of the disk unit 5. When data stored in each file is used, it is read to the corresponding storage area in the data unit 8 to be processed. For ease of explanation, storing data from each storage area to the disk unit 5 and reading data from the disk unit to each storage area will not always be mentioned in the following description.

When a chit or register slip on which character data is recorded is input as an image from the input unit 3, the input image is temporarily stored in the image data storage area 8D by the chit/register slip recognition section 7C. Then, in response to an instruction from the character data recognition section 7D, characters are recognized by extracting character data from the image data in accordance with format information in the format information storage area 8A and field information in the field information storage area 8B by using the work area 8F. The recognized characters are stored in the character data storage area 8C. The field processing section 7E executes field processing in accordance with the field processing procedures stored in the field processing procedure storage section 8E with respect to the character data stored in the character data storage area 8C and displays results of the field processing and the character data stored in the character data storage area 8C or the image data stored in the image data storage area 8D as an image by the image display section 7F. The recognized data may be automatically corrected by using results of user confirmation/correction processing and field processing. Thereafter, the data storage section 7G stores these categories of data in a master file designated by the disk unit 5 or a user.

Figure 21A:
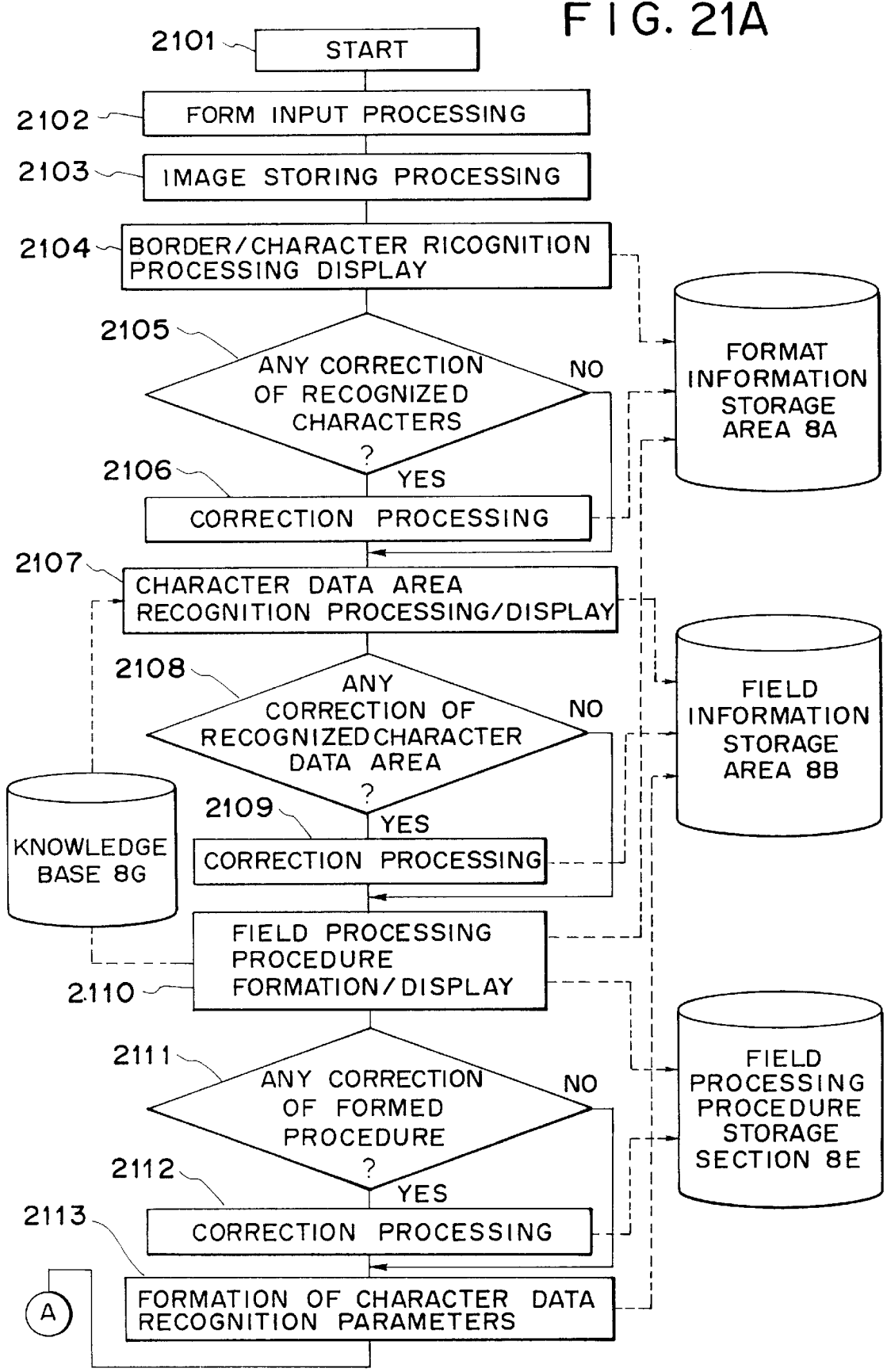
Figures 1, 21B:
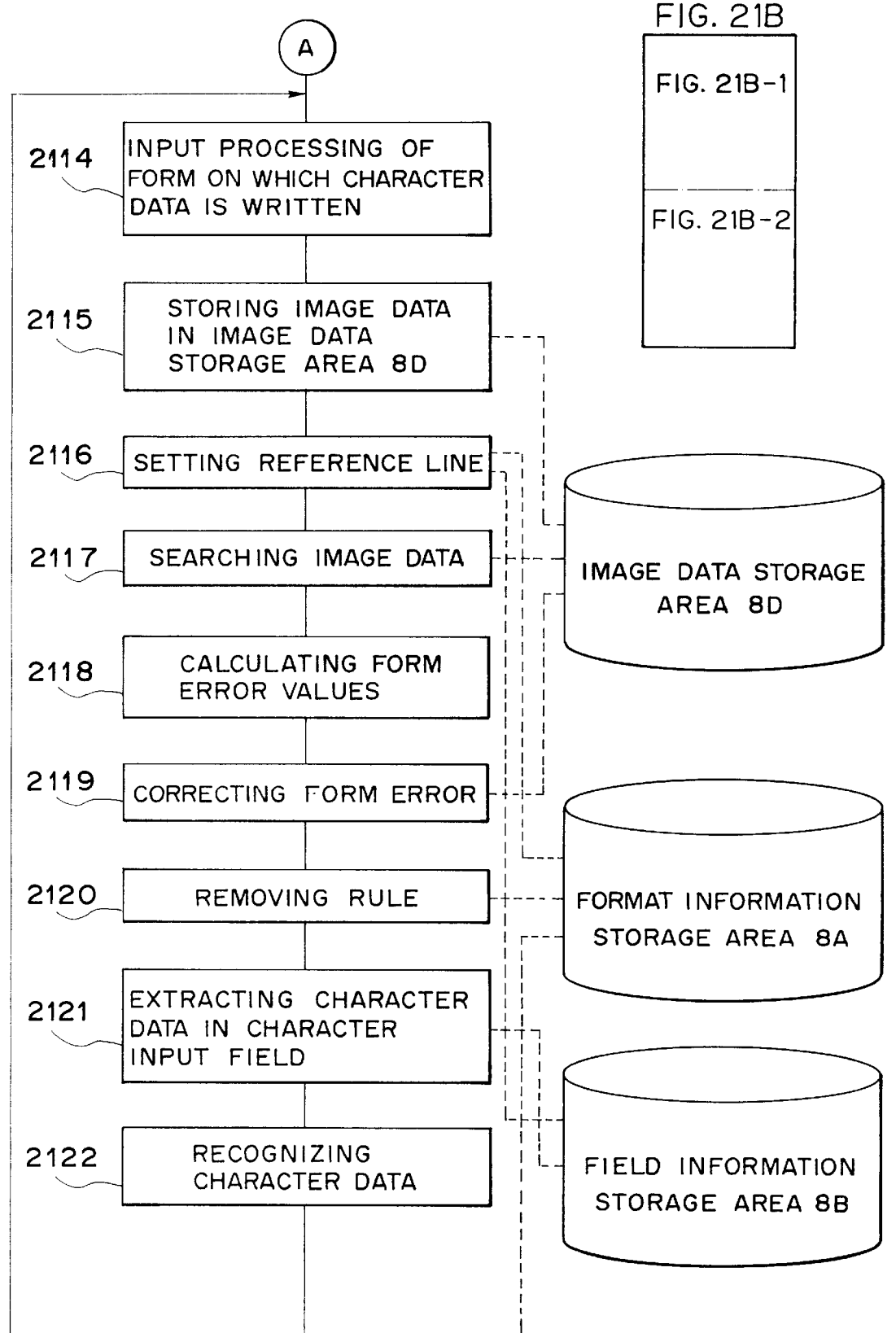
Figures 2, 21B:
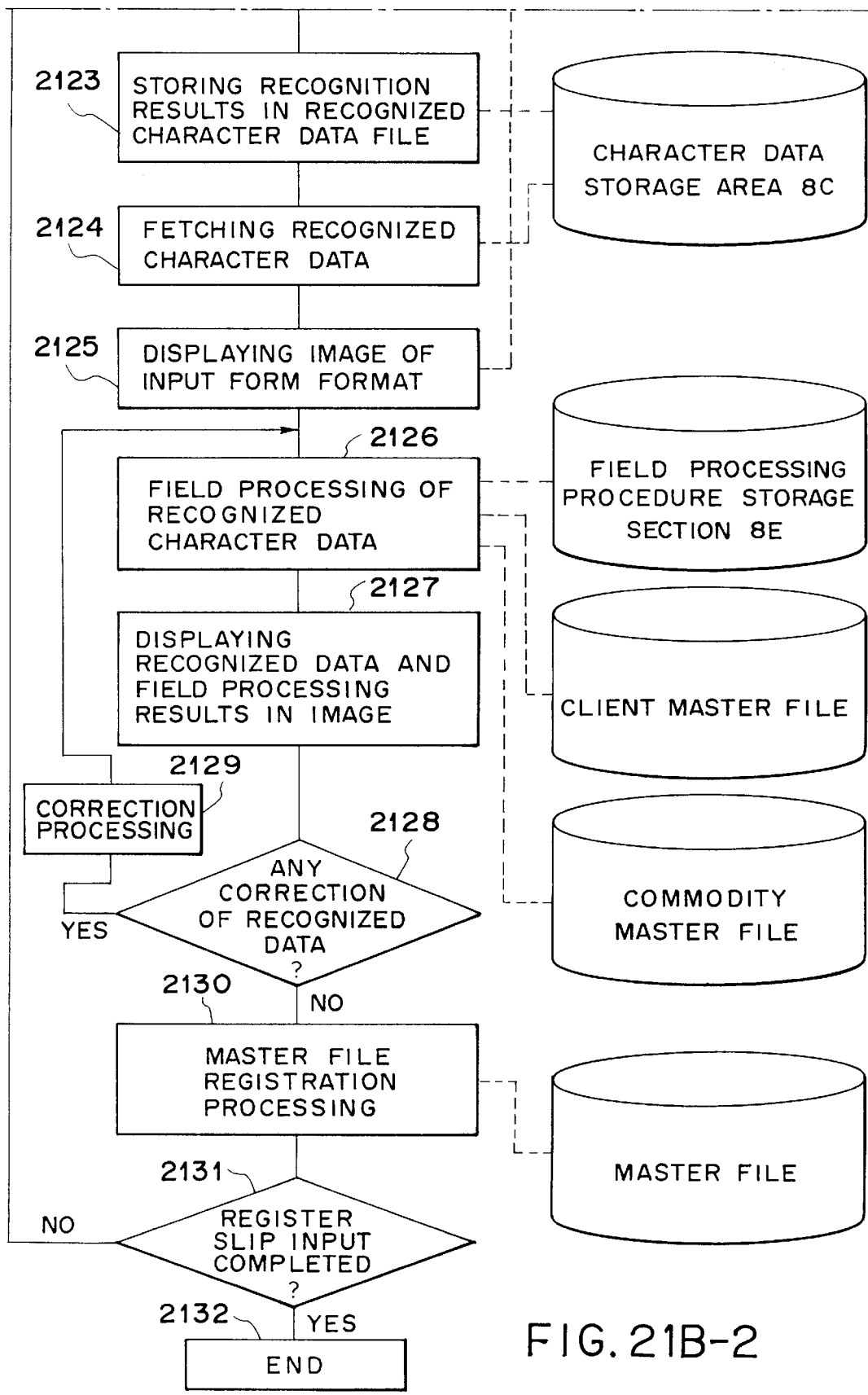

FIG. 2 shows a flow of operations when character data is input.

A slip 201 on which no character data is recorded is input from a reading unit, such as a facsimile unit or an image reader (step 202). At this time, an inclination of the input image data may be corrected. A floppy disk (hereinafter referred to as FD) on which a word processor document describing a register slip format is recorded may be input alternatively.

In step 203, characters and ruled lines on the slip are recognized from the input image or a documentary FD. The positions and names of fields to be input are determined from recognized rows of characters and ruled lines. Results of this determination are displayed as an image, such as that represented by a display example 204, along with the determined fields (input areas=hatched areas). The user may effect confirmation/correction in step 205.

In step 206, the relationships between the fields and attributes of the fields are recognized from the contents of the rows of characters and the positions and names of the fields to prepare field processing procedures. These field processing procedures are conducted to form, from recognized character data recorded in fields (input areas), character data to be recorded in other fields and to verify appropriateness of the character data recorded in the other fields.

The information concerning the rows of characters and the ruled lines recognized from the image is stored in the format information storage area 8A while the formed information positions and names are stored in the field information storage area 8B. The formed field processing procedures are stored in the field processing storage section 8E. The preparatory process is thus completed.

The above-described character/line recognition process and the field processing procedure formation process are the same as the pre-process, the physical structure recognition process and the register slip formation program forming process described in our U.S. Pat. No. 5,228,100, issued Jul. 13, 1993.

Next, a process of inputting a register slip on which character data is recorded will be described below.

In step 211, an image of a slip 210 on which character data is recorded is input, and any inclination or positional error of the input image data is corrected. In step 212, character data is recognized by cutting out only data on characters from the image data based on format information and field information stored in the format information storage area 8A and the field information storage area 8B. In step 213, the recognized character data is stored in the character data storage area 8C. In step 214, field processing of the recognized character data is executed in accordance with the field processing procedures stored in the field processing storage section 8E. In this example, characters A100, B200 recorded in code spaces of the slip 210 are read and characters "Apples" and "Oranges" respectively signified by A100 and B200 are input to fields corresponding to article spaces by the processing with respect to A100 and B200. Unit prices of the apples and the oranges signified by A100 and B200 are invoked, and these unit prices are multiplied by numbers in quantity spaces. Results of this calculation are input to fields corresponding to sum spaces. Numbers 2000 and 1000 in the sum spaces are added together and a consumption tax of 90 with respect to the sum 3000 is calculated to be input to a field corresponding to a consumption tax space. Then, the sum 3000 and the calculated consumption tax are added and a value of 3090 thereby obtained is input to the field corresponding to a total space.

Next, the characters "Apples" and "Oranges" and the sums 2000, 1000, 90 and 3090 obtained by the field processing with respect to the recognized character data items A100 and B200 are recorded in the article spaces and the sum spaces, as represented by a display example 215.

The displayed data is confirmed by the user and a registration instruction is effected in step 216. By the registration instruction, the recognized character data items A100 and B200, and the characters "Apples" and "Oranges" and the sums 2000, 1000, 90 and 3090 obtained by the field processing are stored in a user's master file 217.

Figure 3:
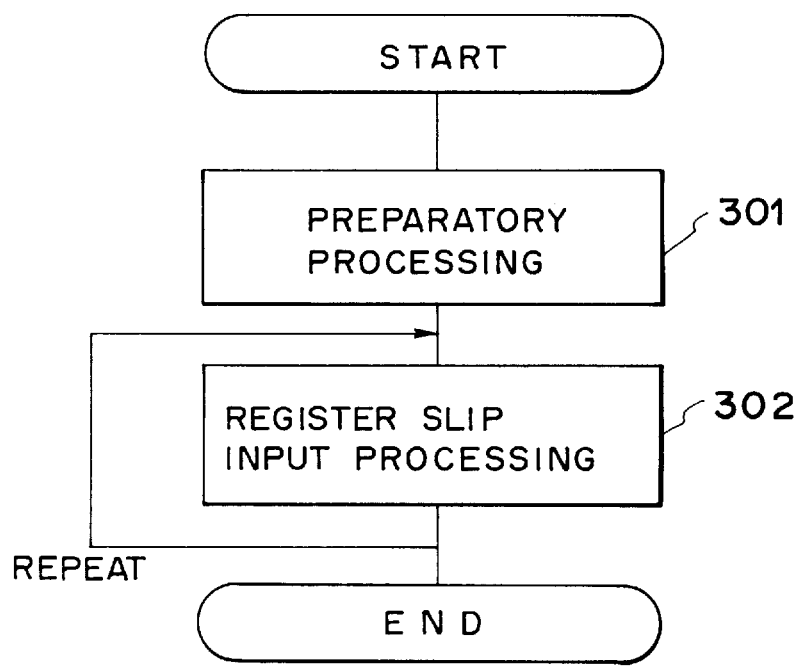
FIG. 3 is a diagram of a major flow of a process in accordance with the embodiment of the present invention.

The process from inputting to final data storing has been described. However, the whole process includes, as shown in FIG. 3, the preparatory process 301 in which data fields (input areas) are set and field processing procedures are formed, and the register slip input process 302 in which a chit or register slip on which character data is recorded is read and character recognition and field processing of recognized characters are effected.

Figure 4:
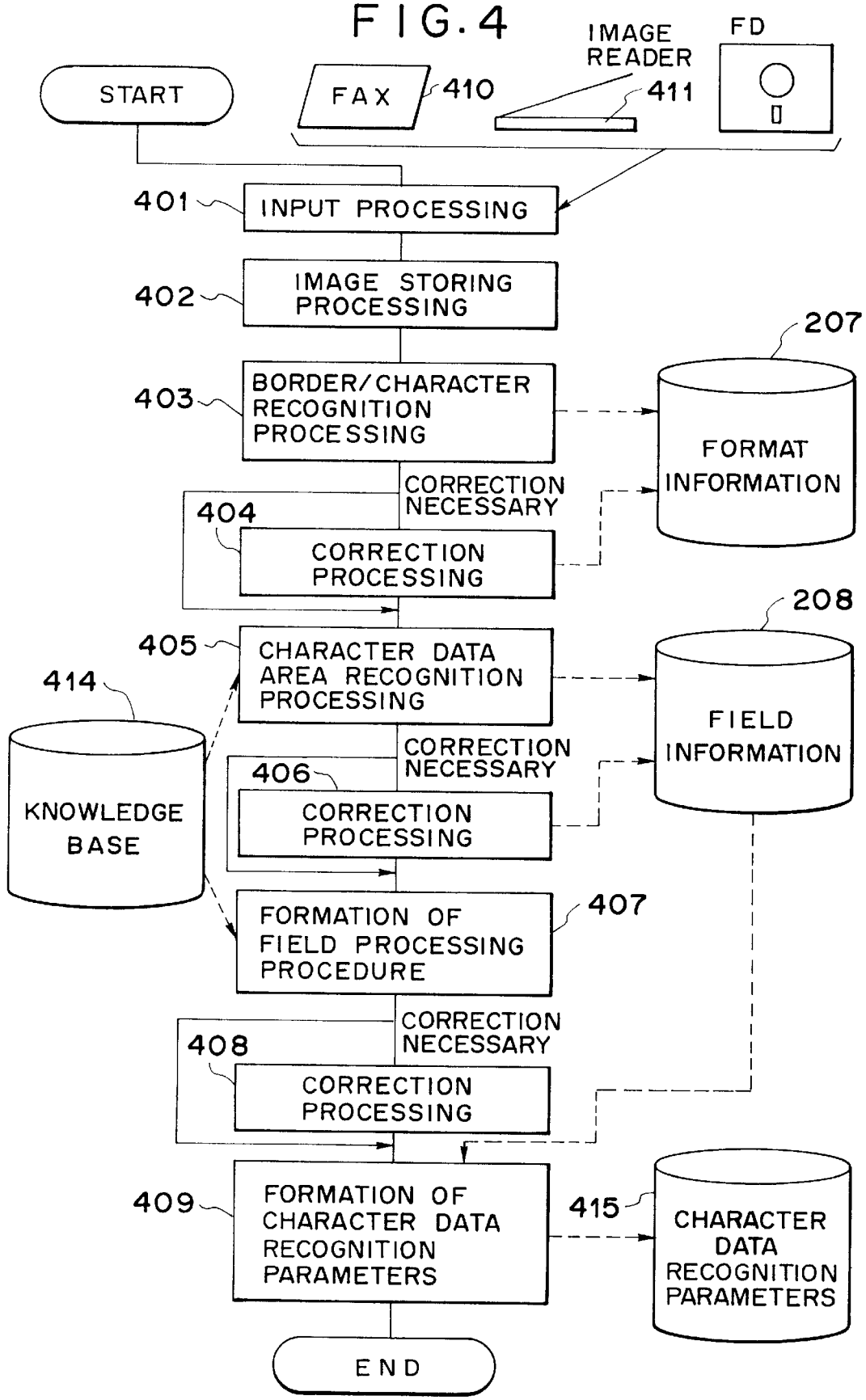
FIG. 4 is a diagram of a flow of preparatory process in accordance with the embodiment of the present invention.

FIG. 4 shows the flow of preparatory process 301. In the step of input processing 401, a form on which no character data is recorded is input from a facsimile unit 410 or an image reader 411. A documentary FD on which the format of a chit/register slip is recorded may be input instead of an input from facsimile unit 410 or image reader 411. If a form on which no character data is recorded is input from the facsimile unit or the image reader, any inclination of the input image data is corrected. The processing for this inclination correction is the same as that described in U.S. Pat. No. 5,228,100.

In the step of image storing processing 402, the image data after being inclination-corrected is temporarily stored in the work area. This processing is unnecessary in a case where a documentary FD is input.

In the step of border/character recognition processing 403, ruled lines and characters are recognized from the image data or the data of a documentary FD, and results of this processing are stored in the format information storage area 8A. This processing for recognizing ruled lines and characters from image data is also the same as that in U.S. Pat. No. 5,228,100. Formation information in accordance with this embodiment corresponds to TAL1, 3, 4, 5 in U.S. Pat. No. 5,228,100. Thereafter, results of the rule/character recognition are displayed as an image on the screen of the console 1. If there is a need to correct them, correction processing 404 is performed and the process then proceeds to the step of character data area recognition processing 405. If there is no need for correction, the process proceeds directly to the step of character data area recognition processing 405.

In the step of character data area recognition processing 405, character data areas are determined based on the format information in the format information storage area 8A and the knowledge data base of knowledge base 8G. Results of this determination are expressed as field information. This processing of determined character data areas is also the same as the processing in U.S. Pat. No. 5,228,100, and A350 in FIG. 103 of U.S. Pat. No. 5,228,100 corresponds to field information in this embodiment. The formed field information is stored in the field information storage area 8B while being displayed on the screen of the console 1. If there is a need to correct this information, correction processing 406 is performed and the process then proceeds to the step of field processing procedure formation 407. If there is no need for correction, the process proceeds directly to the step of field processing procedure formation 407.

In the step of field processing procedure formation 407, necessary field processing procedures are formed by referring to names, relationships and attributes of the fields (character data input areas) formed from the field information in the field information storage area 8B and the knowledge data base of knowledge base 8G. The field processing procedures are, for example, a processing procedure in which unit prices and quantities related to article names are read out with respect to fields having a name "sum" to perform calculation "price×quantity" and to input values of calculation results to the fields "sum", and a processing procedure in which values input to fields having a name "sum" with respect to a field having a name "consumption tax" are read out and added together, calculation "sum total×0.03" is performed and the value obtained by this calculation and by omitting figures thereof below the decimal point is input to the field "consumption tax". This processing for forming field processing procedures is the same as that in U.S. Pat. No. 5,228,100. The formed processing procedures are stored in the field processing procedure storage section 8E while being displayed on the screen of the console 1. They are corrected by correction processing 408 if necessary. If there is no need for correction, the process then proceeds to the step of character data recognition parameter formation 409.

In the step of character data recognition parameter formation 409, character data recognition parameters necessary for recognizing character data are formed from the field information in the field information storage area 8B and are stored in a character data recognition parameter region 415 in the field information storage area 8A. When an input register slip on which character data is recorded, these character recognition parameters serve to determine the kind of format of the input register slip.

Figure 5:
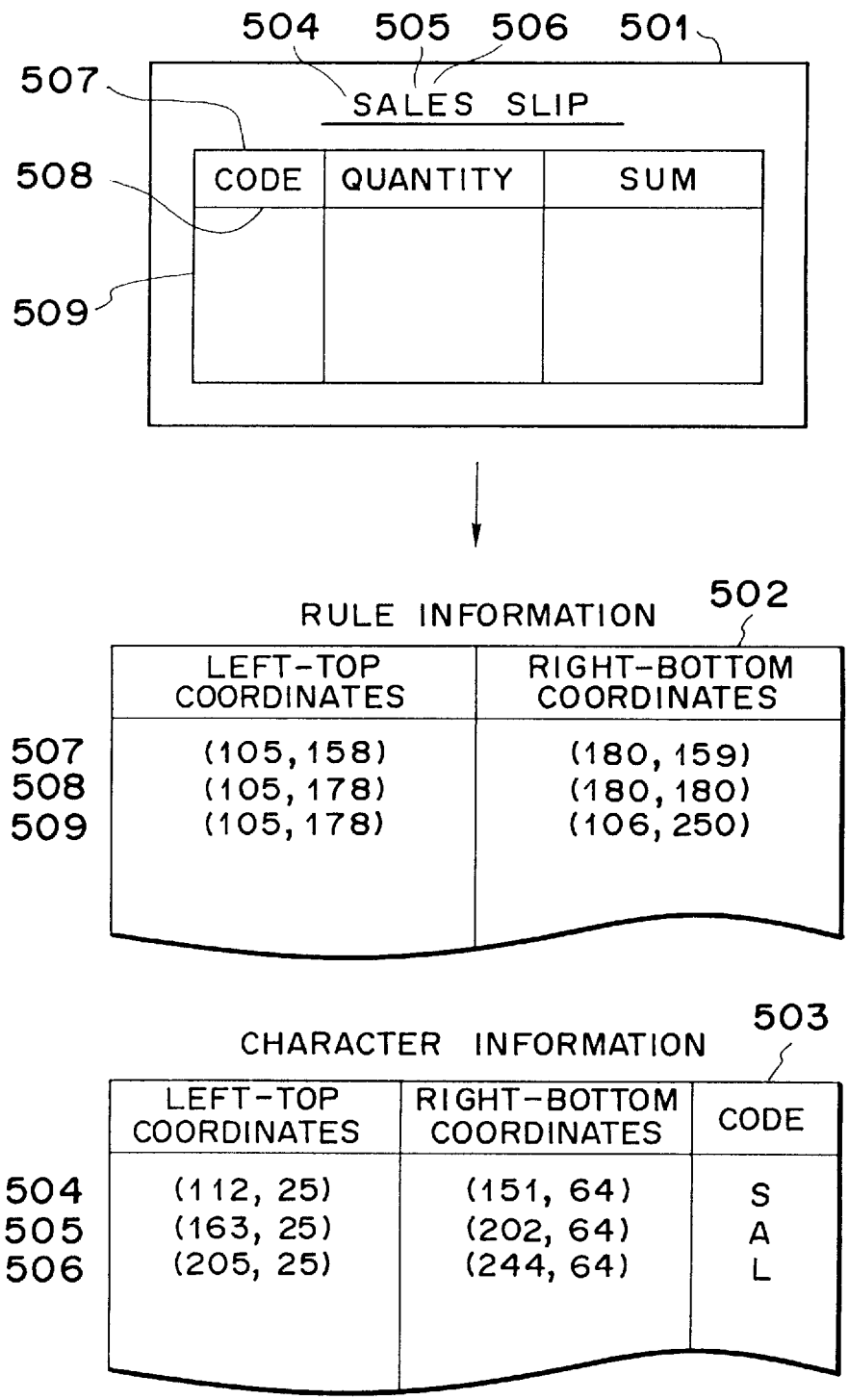
FIG. 5 is a diagram of a stored state of results of recognition of borders and characters on a format in accordance with the embodiment of the present invention.

FIG. 5 shows an example of the content of the format information stored in the format information storage area 8A. A slip 501 is formed so as to include ruled lines 507 to 509 and characters 504 to 506. These ruled lines and characters are separately represented by rule information 502 and character information 503 stored in the format information area 8A. The rule information consists of coordinates representing the left-top position and the right-bottom position of ruled lines, and the character information consists of coordinates representing the left-top position and the right-bottom position of characters and codes essential to characters.

Figure 6:
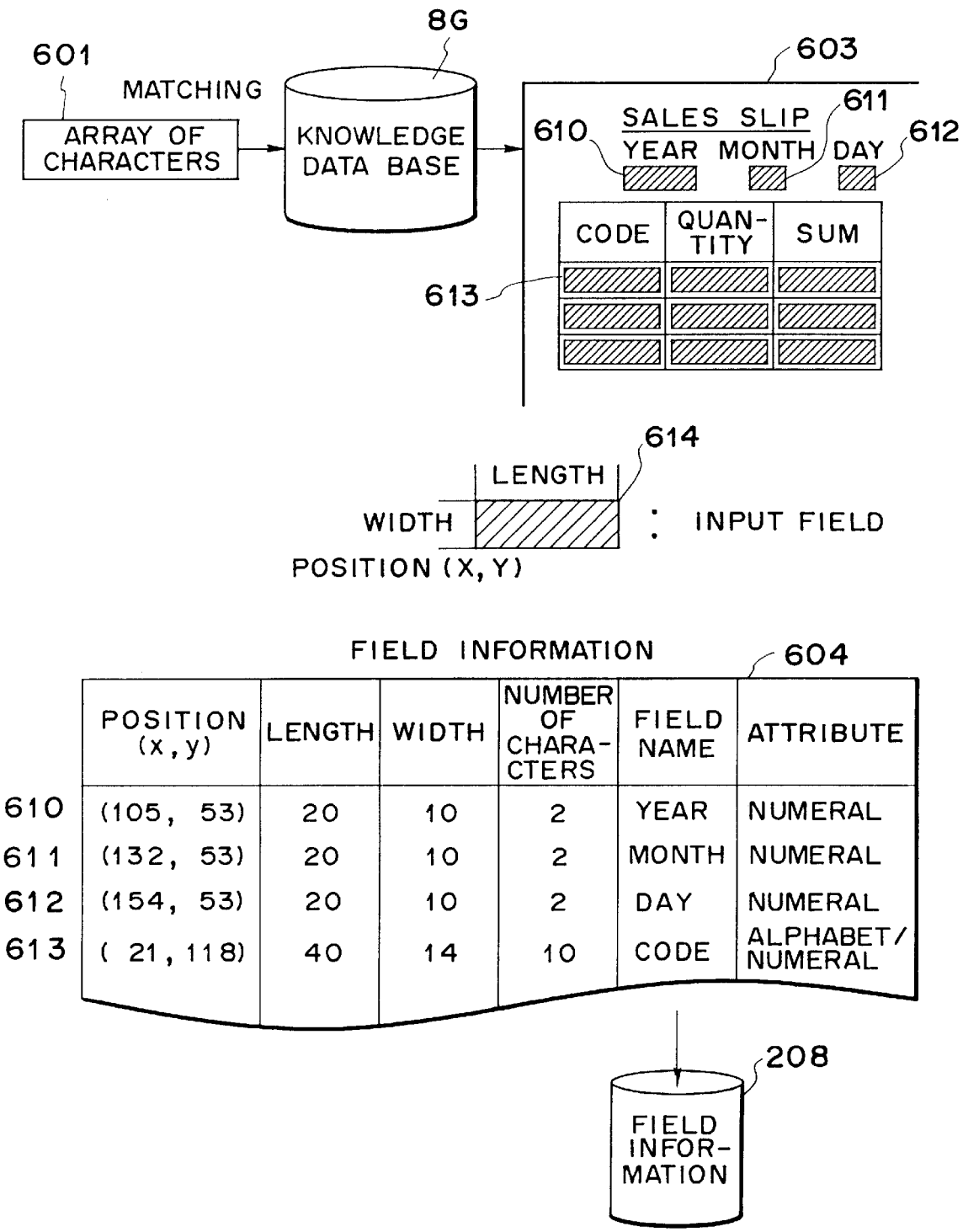
FIG. 6 is a diagram of a stored state of field information, i.e., results of recognition of character data input areas in accordance with the embodiment of the present invention.
Figure 7:
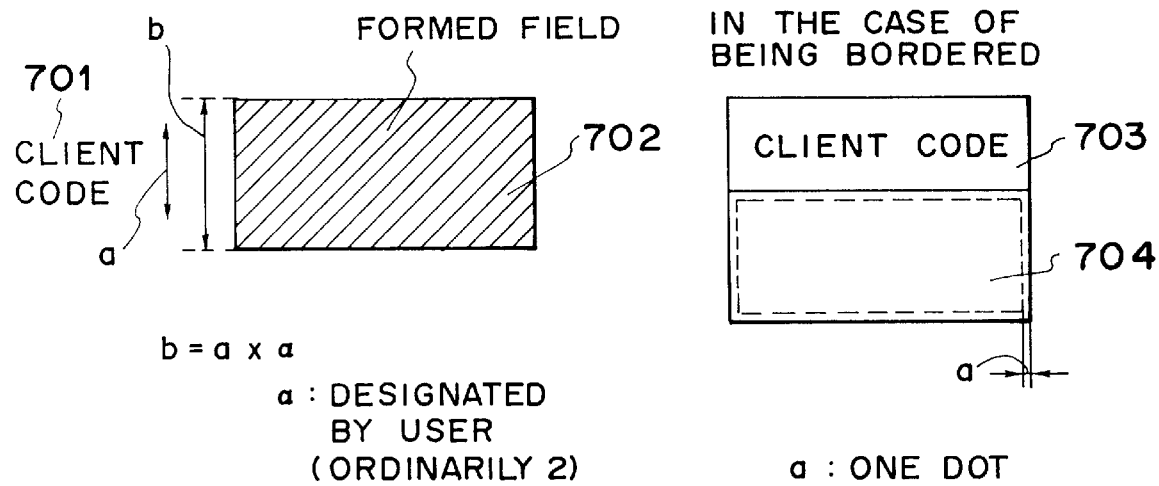
FIG. 7 is a diagram of an example of designation of the size of a character data input area.

FIG. 6 shows an example of the content of the field information formed by recognizing the character data input areas. Arrays of characters are compared with the data in the knowledge data base of knowledge base 8G to determine places in which input fields will be formed. Input fields 610, 611, 612, and 613 thereby determined are displayed in combination with ruled lines and characters in an image, such as that represented by display example 603. Character input fields are represented by areas which are changed in color in the image, for example. The information on the determined fields is stored in the field information storage area 8B in the form of field information 604 consisting of the left-top positions and the right-bottom positions of the fields and the field names. If each character input field is surrounded by borders, the size of the field is set in accordance with the borders in such a manner that one-dot spacing is provided between the field and each border, as shown in FIG. 7, so that characters can be recognized in any position inside the borders. If characters are not surrounded by borders, the size of each input field is set to a value obtained by multiplying the size of the array of characters by a certain value.

Figure 8:
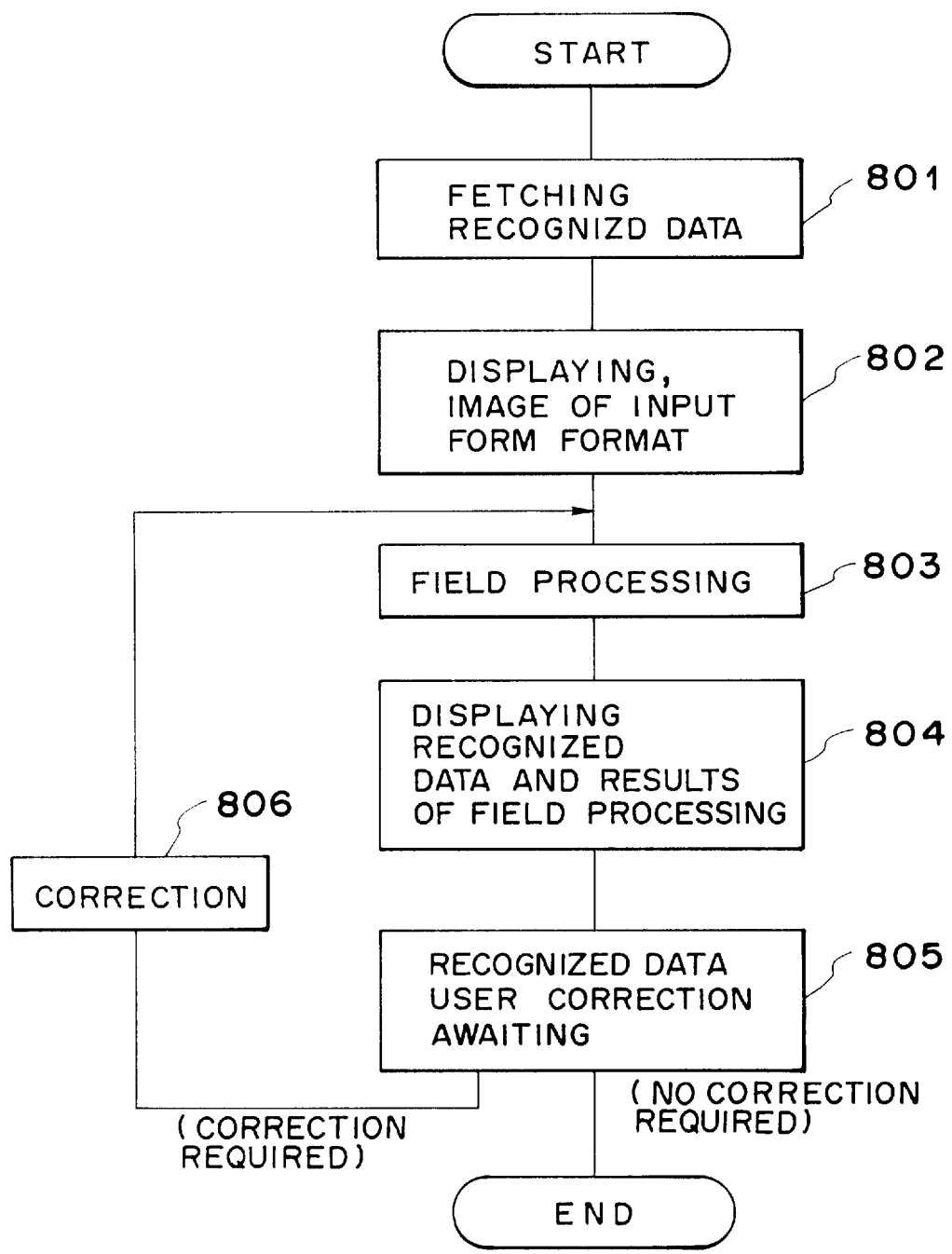
FIG. 8 is a flowchart of the procedure of field processing in accordance with the embodiment of the present invention.

FIG. 8 shows an example of the process of execution of field processing procedures formed by field processing procedure formation 407 of FIG. 4. First, in step 801, character data previously recognized is fetched from the character data storage area 8C into the work area 8F. In step 802, the same format as that of the input form is displayed in an image based on format information stored in the format information storage area 8A. In step 803, field processing of the character data fetched into the work area 8F is executed. In step 804, the results of the field processing are displayed in an image together with the recognized character data. In the example of the slip shown in FIG. 2, the recognized characters are "A100, B200" in code spaces and "10, 20" in quantity spaces, and the results of field processing are "2000, 1000" in sum spaces, "90" in a consumption tax space and "3090" in a total space. These are combined to be displayed as represented by display example 215 of FIG. 2. Thereafter, in step 805, the user confirms whether or not the recognized characters ("A100, B200" in code spaces and "10, 20" in quantity spaces, and so on) are correct. If there is a need to correct them, the process proceeds to step 806 to correct the recognized characters. The processing of step 803 and the subsequent steps is repeated based on the corrected characters. If the recognized characters are correct, the process of field processing is terminated.

Figure 9:
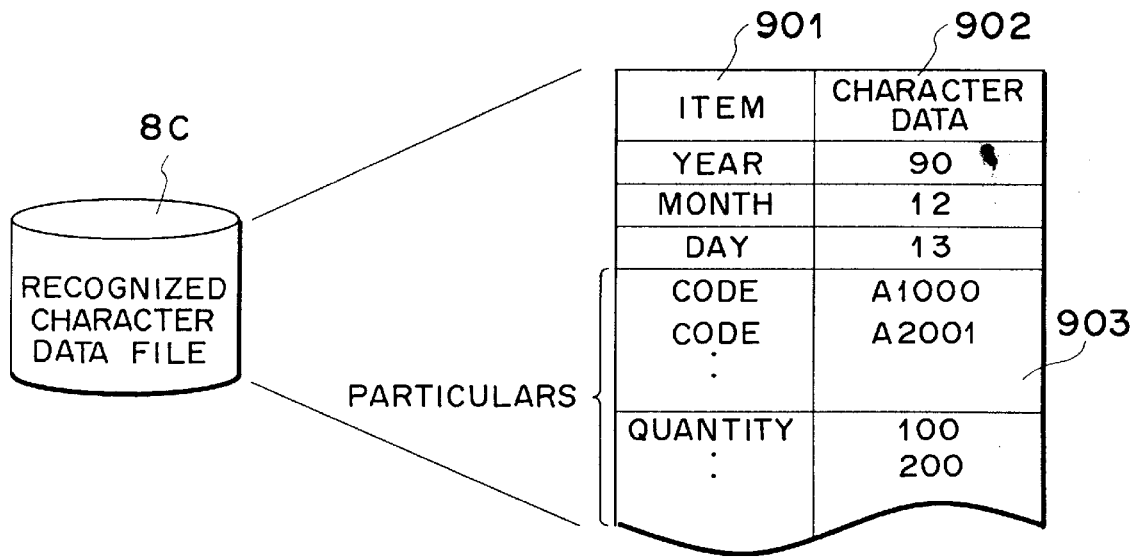
FIG. 9 is a diagram of an example of the content of a file in which recognized character data is stored in accordance with the embodiment of the present invention.

FIG. 9 shows contents of a recognized character data file 904 in which recognized character data is stored. This file contains item names 901 which are names of character data areas, and character data 902 and is sectioned into a data section and a particulars section. Character data in the particulars section is stored by being successively arranged with respect to rows as shown in FIG. 9.

Figure 10:
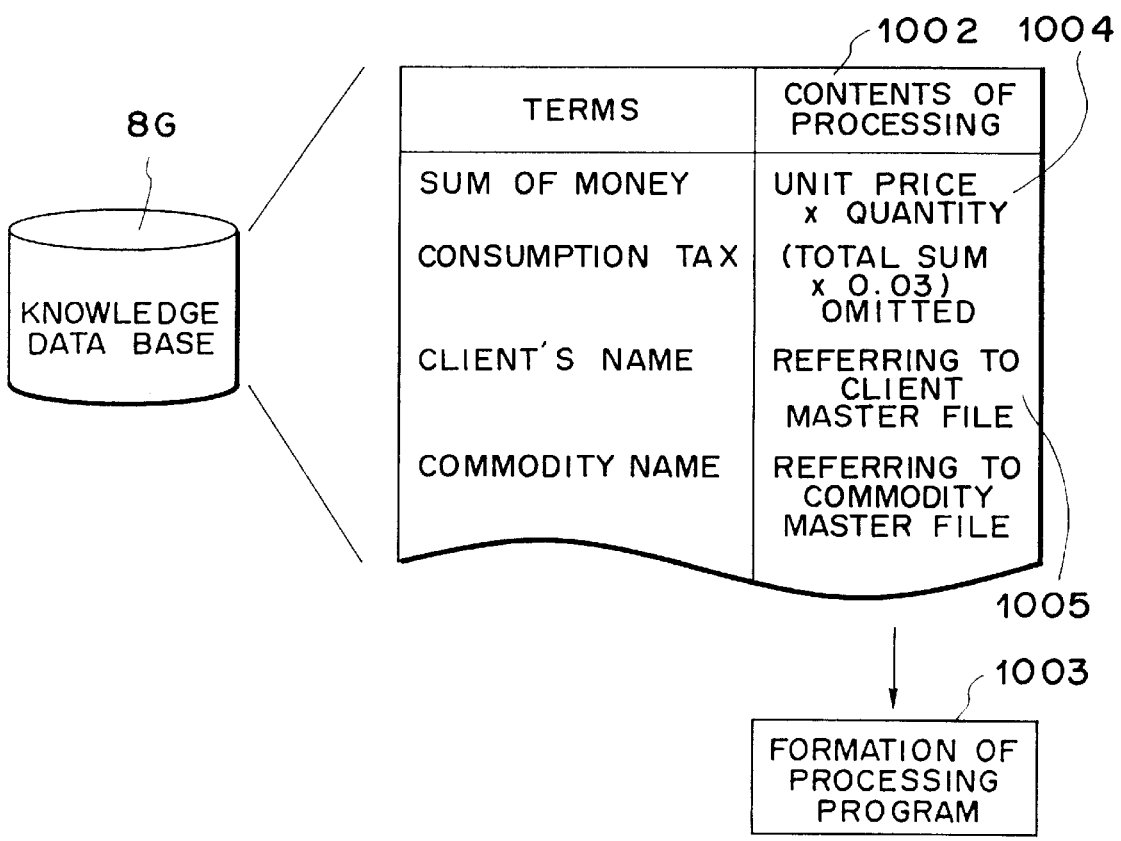
FIG. 10 is a diagram of an example the definition of processing in a knowledge data base in accordance with the embodiment of the present invention.

FIG. 10 shows contents of processing of formed fields. Processing contents are stored in the knowledge data base of knowledge base 8G in correspondence with terms. In this embodiment, the same processing as that described in U.S. Pat. No. 5,228,100 is performed. That is, names, positions, relationships and attributes of the fields are recognized from field information in the field information storage area 8B and processing procedures are formed by looking up the knowledge data base. The contents of processing are, for example, numerical value calculation processing, such as unit price× quantity and sum total×0.03 (figures below the decimal point omitted), and reference processing for finding a client's name by looking up a client master file with a client code or for finding a commodity name by looking up a commodity master file with a commodity code.

Figure 11:
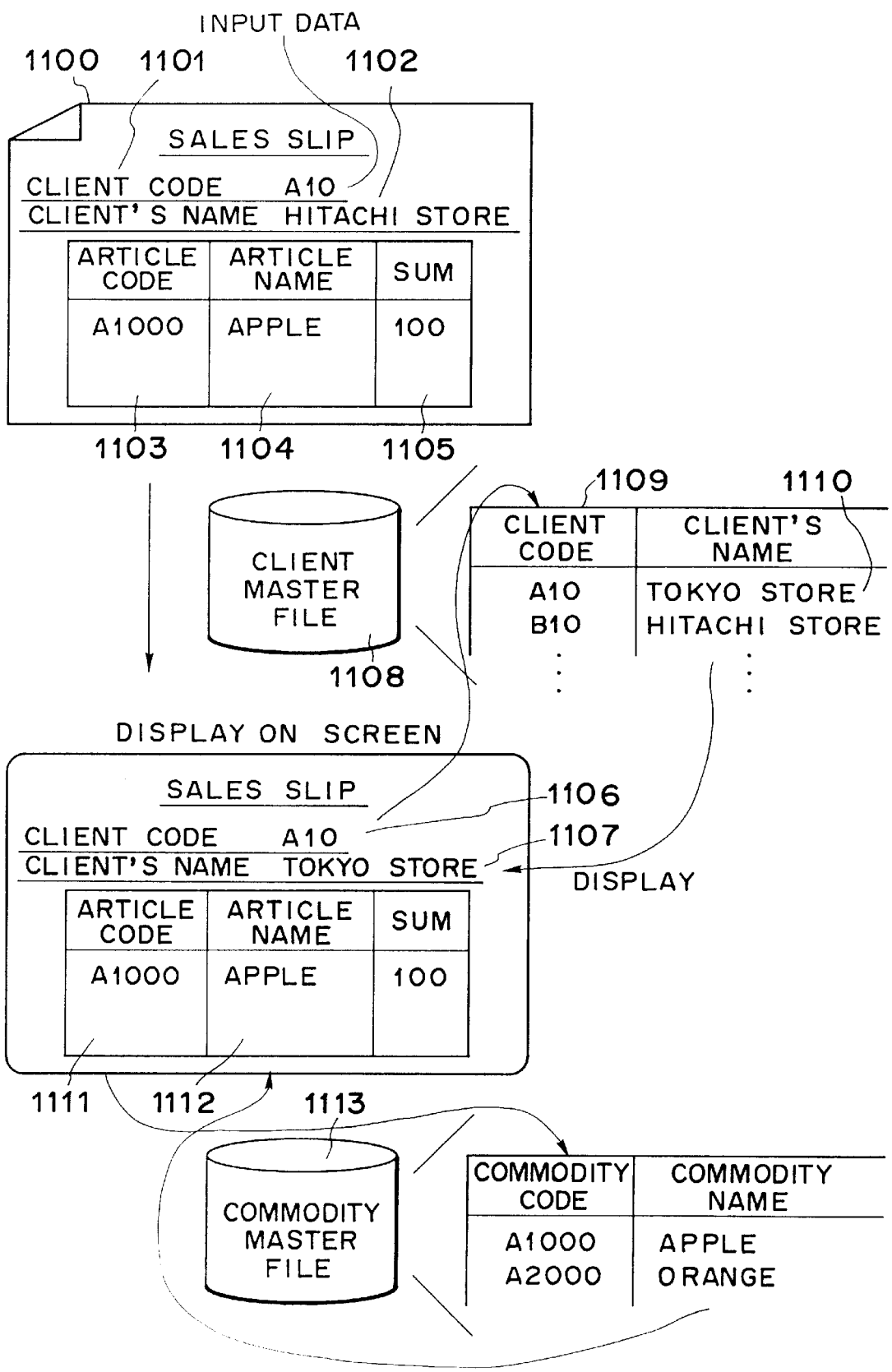
FIG. 11 is a diagram of an example of processing for displaying kanji data by using a master file in accordance with the embodiment of the present invention.

FIG. 11 shows an example of a case of performing reference processing. An input sales slip used in this example includes items: a client code 1101, a client's name 1102, an article code 1103, an article name 1104 and a sum 1105. The client code 1101, the article code 1103, and the sum 1105 are expressed by alphabetical/numerical characters, while the client's name, and the article name 1104 are expressed by kanji and katakana characters. In the character recognition system used in this embodiment, names in kanji or katakana are not recognized. In compensation for this, file names to be referred to are stored in the knowledge base and the information in this file is searched to display the corresponding kanji or katakana data. For example, with respect to client codes (A10) 1106, a client code (A10) 1109 of a client master file 1108 is searched for, and the corresponding client's name (Tokyo Store (in kanji)) 1110 is expressed as client name data (Tokyo Store) 1107. In the illustrated example, a form is input in which a client code (A10) is recorded and characters "Hitachi Store" (in kanji) are written as a client name 1102, but the client name data (Tokyo Store) 1107 is stored as the client name corresponding to the client code (A10). The user can thereby understand from the client's name in the displayed image that the client code (A10) recorded on the form is an error. With respect to an article code (A1000) 1111, a commodity code (A1000) in a client's commodity master file 1113 is referred to and "Apples" (in kanji) is displayed in an article name space 1112.

Since the field processing procedure is formed in this manner, it is possible to instantly confirm whether data recorded on the slip is correct or whether characters are recognized correctly, without recognizing kanji data, by preparing kanji data files corresponding to client codes and article codes, looking up these files from recognized alphabetical/numerical characters to form kanji information, and displaying an image, including kanji data.

Figure 12:
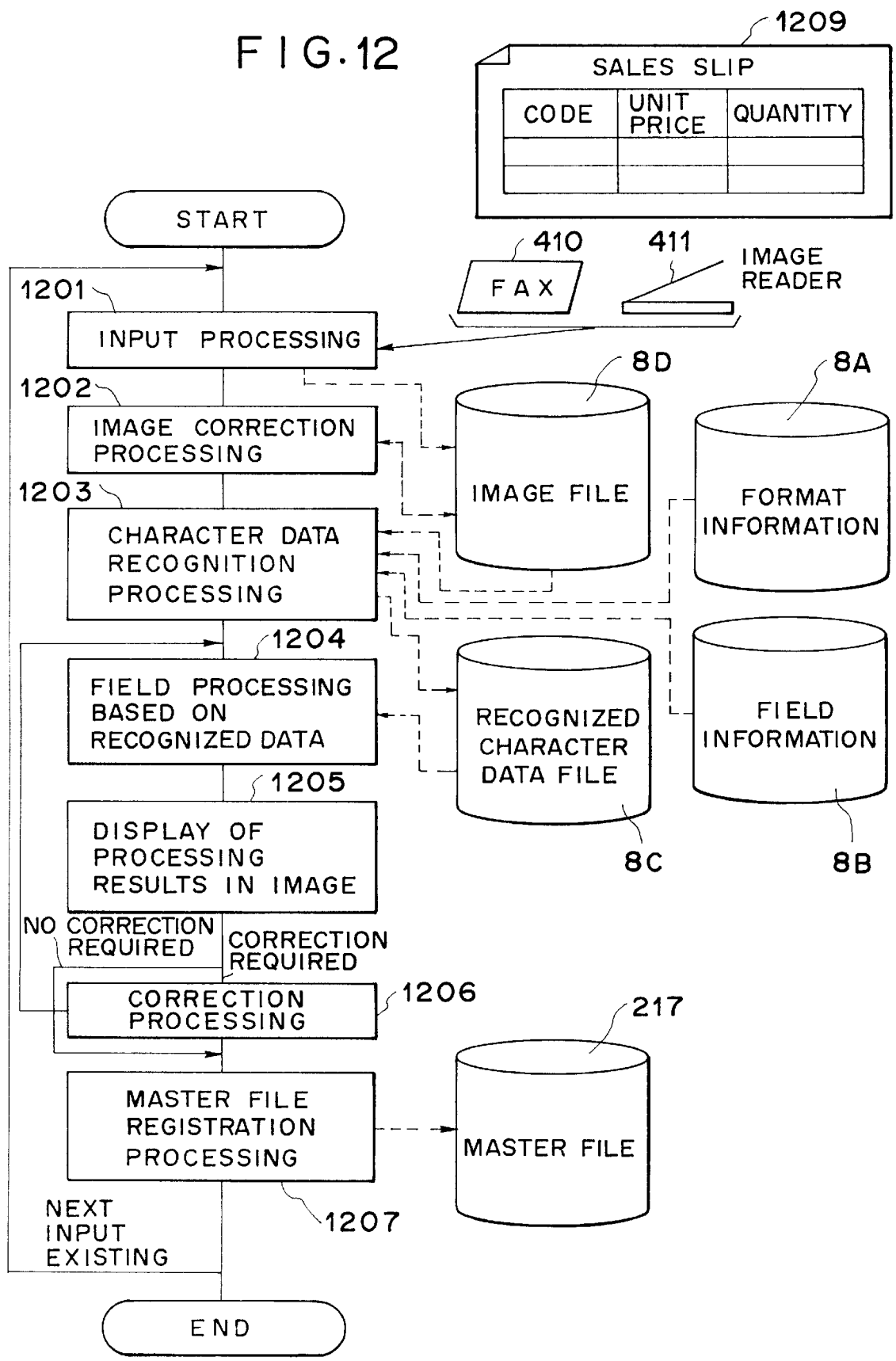
FIG. 12 is a flowchart of processing when a chit or register slip on which character data is recorded is input in accordance with the embodiment of the present invention.

Next, the flow of a process of inputting a chit or register slip on which character data is recorded during use of the system will be described below with reference to FIG. 12. FIG. 12 shows details of the register slip input processing 302 of FIG. 3.

First, in the step of input processing 1201, a chit or register slip on which character data is recorded is input as an image from facsimile unit 410 or image reader 411, and and inclination of the input image data is corrected. This image data is temporarily stored in the image data storage area 8D.

Next, in the step of image correction processing 1202, a positional error and an inclination of the form and an error in the amount of blanks are corrected. In the step of character data recognition processing 1203, portions of ruled lines are removed from the corrected image data by using rule information in the format information previously formed and stored in the format information storage area 8A, and only character data is extracted by using field information to be recognized. The recognized character data is stored in the character data storage area 8C.

Next, in the step of field processing 1204, field processing of the recognized character data stored in the character data storage area 8C is performed in accordance with the field processing procedures previously formed. The recognized character data and results of field processing of this character data are displayed in an image in the step of image display 1205 to be confirmed by the user. If it is determined by the user confirmation that a recognized character is erroneous and needs to be corrected, the process proceeds to the step of correction processing 1206 to effect correction. The process then returns to the step of field processing 1204 to repeat the subsequent steps. If there is no need for correction, the process proceeds directly to the next step, the step of master file registration processing 1207. In the step of master file registration 1207, the input image data, the recognized character data and the character data obtained by field processing combined in a state such as that in the display example 215 of FIG. 2 are registered as final input data in master file 217.

Figure 13:
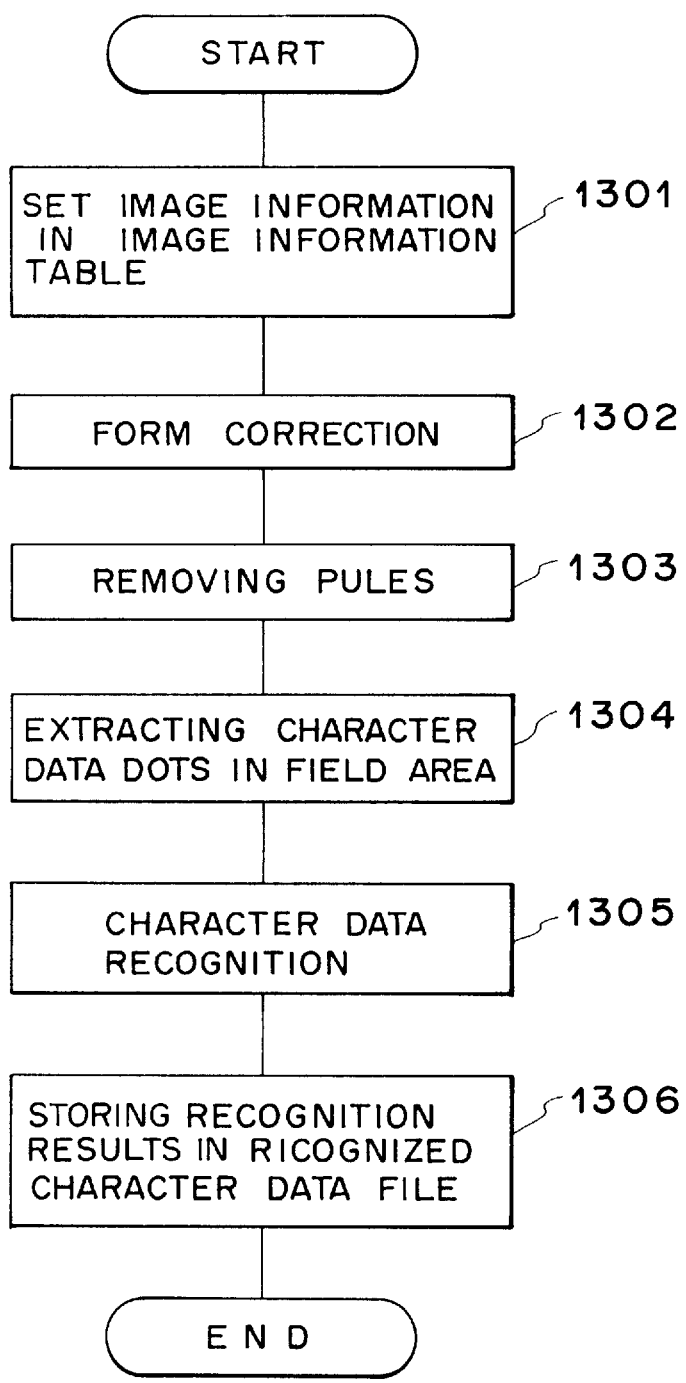
FIG. 13 is a flowchart of an example of a process of image correction processing and character data recognition processing in accordance with the embodiment of the present invention.
Figure 14:
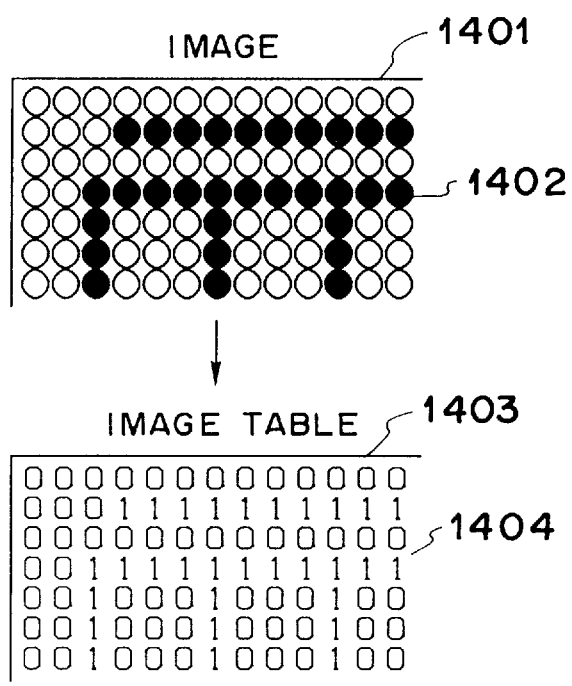
FIG. 14 is a schematic diagram of examples of an image and image information in accordance with the embodiment of the present invention.

FIG. 13 shows details of image correction processing 1202 and character data recognition processing 1203 shown in FIG. 12. First, in step 1301, image data stored in the image file in the disk unit 5 is input in the form of a binary image such as that shown in FIG. 14 to the image data storage area 8D of the data unit. Data in the image data storage area 8D corresponding to black dots of the image is set to 1 while data in the image data storage area 8D corresponding to white dots is set to 0.

Figure 15:
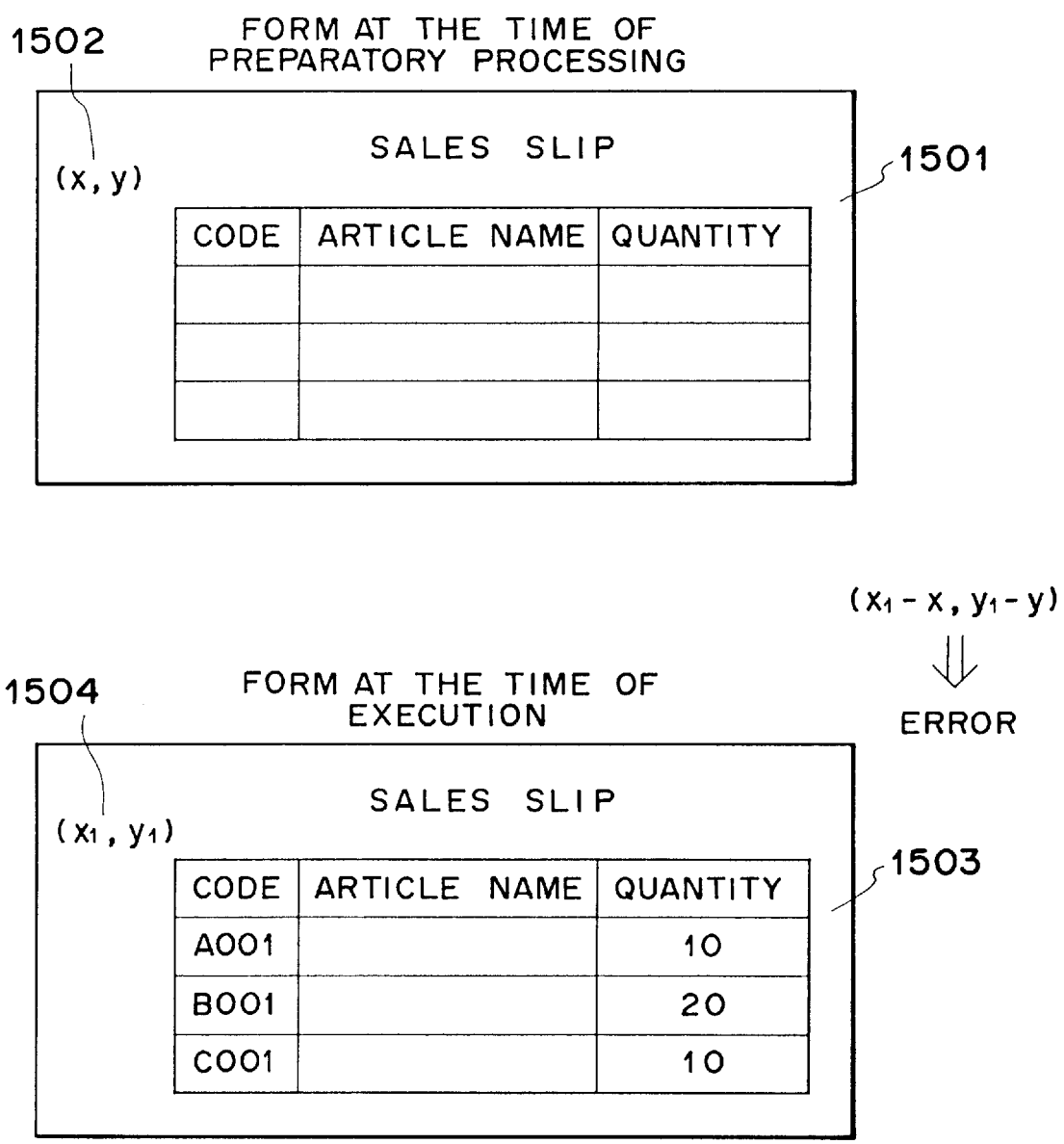
FIG. 15 is a schematic diagram of an example of an error in inputting a form.

In step 1302, the format on the image is corrected in longitudinal and transverse directions. A form used at a preparatory stage (shown in FIG. 4) and a form on which character data is recorded are not always the same. If a form 1501 on which no character data is recorded and which is used at a preparatory stage as shown in FIG. 15 is the form used at the time of execution of inputting characters, for example, by recording the characters by copying, the coordinates (x, y) at an upper left corner of ruled borders on the form 1501 are usually shifted to a different position such as that of the coordinates ($x_1$, $y_1$) at an upper left corner 1504 of the ruled borders of the form 1504.

Figure 17:
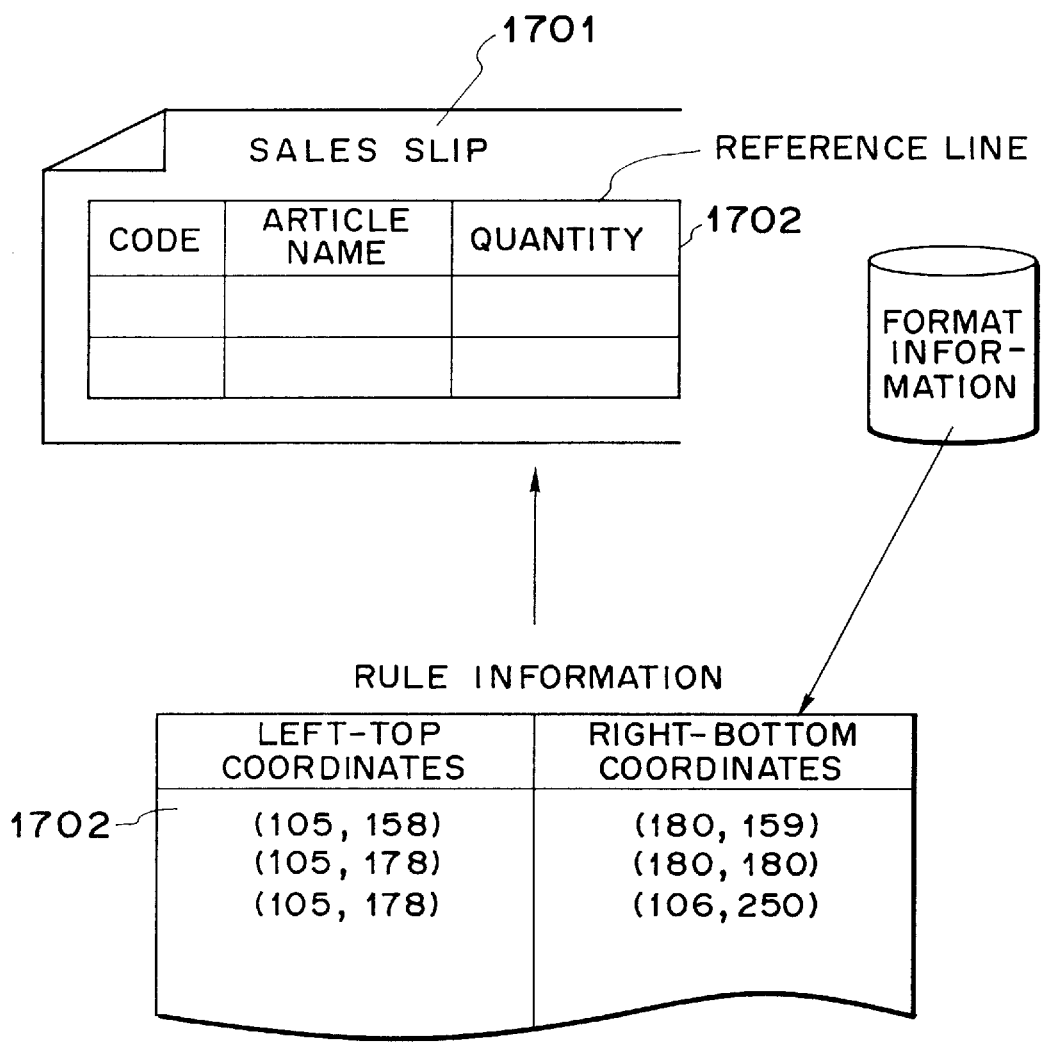
FIG. 17 is a schematic diagram of an example of a reference line used in the format correction process in accordance with the embodiment of the present invention.
Figure 18:
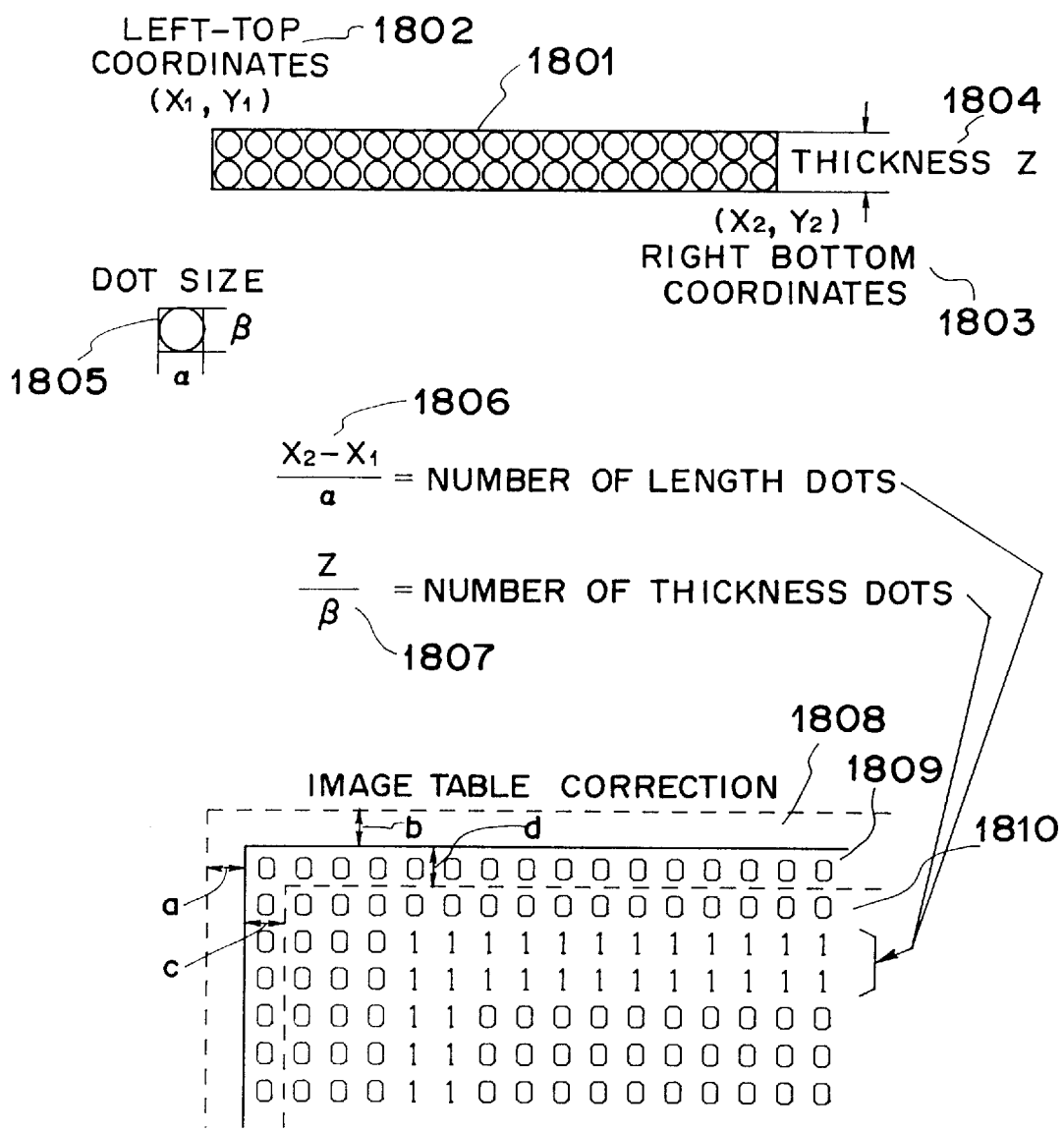
FIG. 18 is a schematic diagram of an example of a method of determining correction values in the in the format correction process in accordance with the embodiment of the present invention.

The shift is corrected by a process shown in FIG. 16. First, in step 1601, a reference line is set. As this reference line, a line at an uppermost and leftmost position on the image is selected. A ruled line 1702 is used as the reference line in an example of a slip 1701 shown in FIG. 17. As information for setting this reference line, rule information in the format information is used. After the reference line has been set, dot conversion is effected based on the left-top coordinates and the right-bottom coordinates of the set reference line, as shown in FIG. 18. If the set reference line is a ruled line 1801, the left-top coordinates 1802 of this ruled line ($x_1$, $y_1$), the right-bottom coordinates are ($x_2$, $y_2$), and the thickness of the ruled lined is z, then the numbers of dots corresponding to the length and the thickness of the ruled line are obtained by the following equations using $\alpha$ and $\beta$ representing the size 1805 of dots, i.e., the diameter in the direction x and the diameter in the direction y, respectively:

Number of length dots=$(x-x)/\alpha$

Number of thickness dots=$z/\beta$

Next, in step 1602, a ruled line having the same length and thickness as this reference line and located in an uppermost and leftmost position on the image is searched for. The difference between the start position (left corner) of the ruled line found by searching and the start position (left corner) of the reference line is obtained in step 1603. In step 1604, the data in the image data storage area 8D is corrected. A solid line 1809 indicates an end of input image data, while a broken line 1808 represents an example of a proper end of the image data. In this example, the input image data is corrected in the leftward direction by a and in the upward direction by b. A broken line 1810 indicates another example of the proper end of the image data. In this example, the input image data is corrected in the rightward direction by c and in the downward direction by b. In the case of this correction, the values a and b or c and d are correction values.

Figure 19:
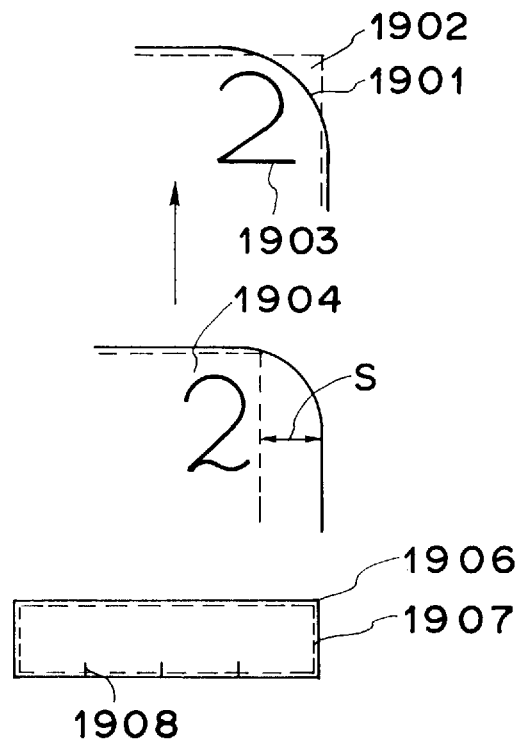
FIG. 19 is a schematic diagram of examples of input areas in which ruled lines exist in accordance with the embodiment of the present invention.

After the correction of the form has been completed, portions of ruled lines are removed. In some cases, ruled line data is included in a character input area formed as field information. For example, a ruled border line is rounded as in the case of ruled line 1901 shown in FIG. 19. In this case, if a character area is set inside the ruled borders as an input area 1901, the area is narrowed by a size S so that the area becomes difficult to use. For this reason, a character input area is set so as to cover an area outside the rounded portion of the ruled line 1901 as represented by a character input area 1902, thus removing a rounded corner portion of the ruled line 1901. The data on the rounded portion of the ruled line is included in a form shown in a table 1909 in the format information as in U.S. Pat. No. 5,228,100. In sum spaces in ordinary slips, place partition ruled lines 1908 are usually provided to enable sum figures to be easily entered. Such lines are located inside the ruled lines 1906 and also in a character input area 1097. It is therefore necessary to remove such lines.

Figure 20:
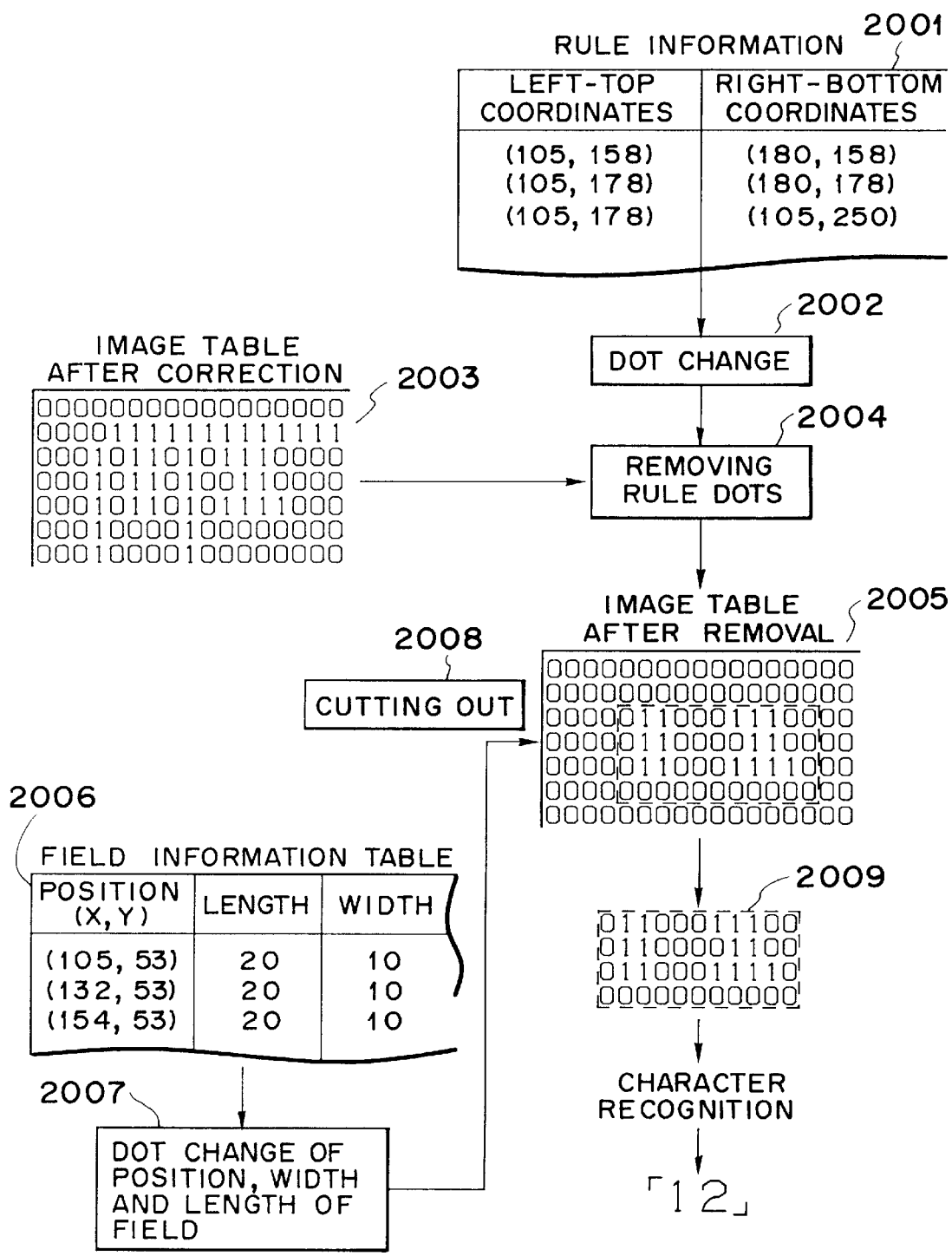
FIG. 20 is a schematic diagram of an example of a process for extracting character data by removing rule information from image data in accordance with the embodiment of the present invention.

FIG. 20 shows a ruled line removal method. Dots based on whole ruled line information in format information are converted in step 2002. The conversion method is the same as that shown in FIG. 18. Image table information previously corrected is inverted based on the dot-converted rule information in step 2004. After the completion of the ruled line removal, data in the character areas is extracted in step 1304 of FIG. 13, and the kinds of characters are recognized in step 1305. Data extraction from the character areas is effected in such a manner that the position, width and length of each field is dot-converted from field information 604 in a field information storage area 208 and data within these limits is cut out in step 2008. Image information 2009 corresponds to the cut-out data. Characters are identified based on this cut-out data in step 1305 of FIG. 13. The identified characters are stored in the recognized character data file in the character data storage area 8C in step 1306.

FIGS. 21A, 21B-1 and 21B-2 show an example of application of the method of the present invention to the information processing system shown in FIG. 1. Details of the process are the same as those described above, and the overall flow of the process will be described below. The process shown in FIG. 21A is a process at a preparatory stage. The process shown in FIGS. 21B-1 and 21B-2 is a process in which data is actually input from a form of a chit or register slip on which the data is recorded.

The process at the preparatory stage will first be described below. At the preparatory stage, the format of a form on which character data is recorded is read and the spaces in which characters on the format of this form are to be entered are recognized. Also, based on particular character data, field processing procedures for forming other character data are formed.

First, in step 2102, information on the recording face of a form on which no data is recorded is input as image data by an input unit 3 such as a facsimile unit or an image reader. Input image data is stored in the image data storage area 8D in step 2103. In step 2104, ruled lines and borders included in this image data and characters on the format are read and recognized to form ruled line information and character information, such as those shown in FIG. 5. The formed ruled line information and character information are stored as format information in the format information storage area 8A while being displayed as an image such as that of slip 2101 of FIG. 2 on the display screen of the console 1.

The format input as an image is checked as to whether the format of the input form is correctly reproduced (step 2105). If there is no need to correct it, the process proceeds directly to the next step 2107. If there is a need to correct it, correction processing (step 2106) is performed and the process thereafter proceeds to step 2107. In step 2107, the knowledge data base of knowledge base 8G is looked up, input areas (fields) where character data is to be detected are set from the characters and the ruled lines in the format previously recognized, and information representing these areas is stored as field information such as that shown in FIG. 6 in the field information storage area 8B. The set input areas are displayed as hatched areas, such as those in the display example 204 shown in FIG. 2, on the format of slip 201 displayed on the display screen. The displayed input areas are checked as to whether they are correctly set (step 2108). If there is no need to correct it, the process proceeds directly to the next step 2110. If there is a need to correct it, correction processing (step 2109) is performed and the process thereafter proceeds to step 2110.

In step 2110, the knowledge data base of knowledge base 8G is looked up, the relationship between data items recorded in the input areas previously set is recognized from the characters included in the format, and field processing procedures, based on data input to particular input areas, for forming data to be input to other input areas are prepared. The prepared field processing procedures are stored in the field processing procedure storage area 8E and displayed as an image to confirm whether there is a need to correct it (step 2111). If there is no need to correct it, the process proceeds directly to the next step 2113. If there is a need for correction, correction processing (step 2112) is performed and the process thereafter proceeds to the next step 2113. In step 2113, parameters for recognizing character data in the input areas are formed and stored in the field information storage area 8B. These parameters are used to extract field information from the format.

The preparatory process is completed in step 2113.

The process of reading recorded character data from a form (chit/register slip) on which data is actually recorded will be described below with reference to FIG. 21B.

In step 2114, data on the face of a form on which character data is recorded (the form processed by the preparatory process) is input as image data by the facsimile unit or image reader as in the case of the preparatory process. The input image is stored in the image data storage area 8D (step 2115). In step 2116, ruled line information in the format information is looked up and a reference line is selected therefrom. The input image data is searched to find a ruled line having a length and a thickness corresponding to those of the reference line and located at a similar position from the image (step 2117). The position of the ruled line found and the position of the reference line are compared and the positional difference therebetween and an inclination correction value are calculated (step 2118). In step 2119, the image data is corrected based on the calculated positional difference so as to eliminate the positional difference.

After the completion of the form positional difference correction, ruled lines are erased from this image data by referring to the format information (step 2120), and character data in the input areas is extracted from the image data, from which ruled lines have been removed, by referring to the field information (step 2121). The extracted character data is recognized (step 2123) and is stored in the character data storage area (Step 2123). Subsequently, the format read at the preparatory stage is displayed in a form such as that of slip 201 shown in FIG. 2 (step 2125), and field processing is performed with respect to the recognized characters based on the field processing procedures stored in the field processing procedure storage section (step 2126). Data obtained by field processing is input to the corresponding input areas and are combined with the recognized character data and the format to be displayed in a form such as that of display example 215 shown in FIG. 2 (step 2127).

The characters displayed in an image (recognized in step 2128) are checked to determine whether they need to be corrected (step 2128). If there is no need to correct them, the process proceeds directly to step 2130. If there is a need to correct them, correction processing (step 2129) is performed and the step 2126 and subsequent steps are repeated. In step 2130, the recognized character data and the data obtained by field processing are registered in the master file together with the format input at the preparatory stage, and a check is made as to whether some register slip to be input remains. If there is a remaining slip, the processing of step 2114 and the subsequent steps is repeated with respect to the remaining slip. If no slip remains, the input procedure is terminated.

In accordance with the embodiment, the format of a form is recognized, lines and character patterns constituting the format in image information including input data and character patterns in input areas are discriminated from each other, and the character patterns in the input areas are recognized. By this system, character data recorded on an ordinary chit, slip or the like without being surrounded by borders, character data which is underlined and character data surrounded by borders rounded at corners can be input to a computer as well as characters on a special form for an OCR. A positional error of a form can be corrected on image data, so that the user has no difficulty in preventing a positional error of the form at the time of image inputting.

Further, a kind of processing previously selected according to the format of a form is effected with respect to character data recorded on the form, and results of the processing are displayed, thereby making it possible to check appropriateness of the check recorded character data.

What is claimed is:

1. A character data input method for an information processing system, comprising the steps of:

reading format information provided on a first form, which has only said format information and on which no data is recorded, from an input unit for inputting said format information, wherein said format information includes character data information and border data information;

forming field information defining a plurality of data input areas on said first form in which data is to be recorded by recognizing a character pattern and a border pattern in said format information using information stored in a knowledge base;

reading information from a second form, which has the same format information and field information as said first form, on which data is recorded, from said input unit for inputting image information;

removing a border pattern of said second form by inverting pixels of said border pattern of said second form, as a result of a comparison of said border pattern of said first form and said border pattern of said second form;

extracting said data in data input areas defined in said field information of said second form; and recognizing character data of said data in input areas of said field information of said second form.

2. A method according to claim 1, further comprising the step of displaying the recognized character data in each data input area.

3. A method according to claim 2, further comprising the step of, after reading information from said second form, correcting horizontal and vertical offsets and skew of this information relative to the information on said first form.

4. A method according to claim 1, further comprising the step of, after reading information from said second form, correcting horizontal and vertical offsets and skew of this information relative to the information on said first form.

5. A character data input method for an information processing system, said method comprising the steps of:

reading format information provided on a first form, which has only said format information and on which no data is recorded, by using an input unit for inputting said format information;

forming field information defining a plurality of data input areas on said first form in which data is to be recorded by recognizing a character pattern and a border pattern in said format information using information stored in a knowledge base;

naming each of said plurality of data input areas in accordance with recognized character patterns;

displaying, in an image, said recognized character pattern and border pattern of said format information and said plurality of data input areas in which data is to be recorded;

confirming whether there is an error in the displayed image of said recognized character pattern and border pattern and said plurality of data input areas, and correcting any error, if there is an error;

forming and display at least one field processing procedure for referring to said recognized character pattern and border pattern of said format information and the field information defining said plurality of data input areas, for processing character data to be recorded to some of said plurality of data input areas to form data to be input to at least one of the other of said data input areas and inputting the formed data in said at least said one data input area;

confirming whether there is an error in the displayed field processing procedure, and correcting any error, if there is an error;

reading information from a second form having the same format information and said field information as said first form and on which character data is recorded, by using the input unit for inputting image information;

correcting horizontal and vertical offsets and skew of the information on the second form on which said character data is recorded relative to said format information on the first form on which no data is recorded;

removing a border pattern of said second form by inverting pixels of said border pattern of said second form, as a result of a comparison of said border pattern of said first form and said border pattern of said second form;

extracting the character data in data input areas defined in said field information of said second form;

recognizing the character data in said input areas of said field information of said second form;

executing the field processing procedure with respect to the recognized character data;

displaying the recognized character data and data obtained by the field processing in data input areas of the format;

confirming whether there is an error in the character data being displayed, correcting the character data if there is an error, and thereafter repeating the field processing procedure with respect to the corrected character data; and if there is no error in the displayed character data, storing the recognized character data and data obtained by the field processing in memory means along with data defining the data input areas of the format.

6. A character data input method for an information processing system, said method comprising the steps of:

reading format information provided on a first form, which has only said format information and on which no data is recorded, by using an input unit for inputting said format information;

forming field information defining a plurality of data input areas on said first form in which data is to be recorded by recognizing a character pattern and a border pattern in said format information using information stored in a knowledge base;

naming each of said plurality of data input areas in accordance with recognized character patterns;

displaying, in an image, said recognized character pattern and border pattern of said form information and said plurality of data input areas in which data is to be recorded;

confirming whether there is an error in the displayed image of said recognized character pattern and border pattern and said plurality of data input areas, and correcting any error, if there is an error;

reading information from a second form having the same format information and said field information as said first form and on which data is recorded, using the input unit;

correcting horizontal and vertical offsets and skew of the information on the second form on which said character data is recorded relative to said format information on the first form on which no data is recorded;

removing a border pattern of said second form by inverting pixels of said border pattern of said second form, as a result of a comparison of said border pattern of said firm form and said border pattern of said second form;

extracting said data in input areas defined in said field information of said second form;

recognizing character data of said data in said input areas of said field information of said second form;

executing the field processing procedure with respect to the recognized character data;

displaying the recognized character data and data obtained by the field processing in data input areas of the format;

confirming whether there is an error in the character data being displayed, correcting the character data if there is an error, and thereafter repeating the field processing procedure with respect to the corrected character data; and if there is no error in the displayed character data, storing the recognized character data and data obtained by the field processing in memory means along with data defining the data input areas of the format.

7. A character data input method for an information processing system, said method comprising the steps of:

reading form an input unit, first image information of a first form which has format information and on which no data is recorded;

distinguishing and recognizing a character pattern and a border pattern included in said first image information;

generating field information from the recognition result of said character pattern and said border pattern;

reading from said input unit, second image information of a second form on which data is recorded;

comparing said second image information with the recognition result of said border pattern;

inverting the pixels of a matched border pattern in said second image information;

extracting a character pattern of said second image information through said field information;

recognizing said character pattern of said second image information; and determining the correctness of attributes of data in said second image information utilizing the recognition result of said character pattern of said first image information.

* * * * *